(12) United States Patent
Lord et al.

(10) Patent No.: US 9,581,455 B2
(45) Date of Patent: *Feb. 28, 2017

(54) SYSTEMS AND METHODS FOR PROVIDING AT LEAST A PORTION OF A TRAVEL PLAN THAT CALLS FOR AT LEAST ONE TRANSPORTATION VEHICLE UNIT

(71) Applicant: Elwha LLC, Bellevue, WA (US)

(72) Inventors: Richard T. Lord, Gig Harbor, WA (US); Robert W. Lord, Seattle, WA (US); Nathan P. Myhrvold, Medina, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,534

(22) Filed: Aug. 8, 2014

(65) Prior Publication Data

US 2015/0323327 A1 Nov. 12, 2015

Related U.S. Application Data

(63) Continuation-in-part of application No. 14/318,182, filed on Jun. 27, 2014, and a continuation-in-part of application No. 14/329,451, filed on Jul. 11, 2014, which is a continuation of application No. 14/328,002, filed on Jul. 10, 2014.

(Continued)

(51) Int. Cl.
*G01C 21/34* (2006.01)
(52) U.S. Cl.
CPC ......... *G01C 21/3423* (2013.01); *G01C 21/34* (2013.01); *G01C 21/3438* (2013.01)

(58) Field of Classification Search
CPC .. B61L 27/0027; B61L 3/006; B61L 15/0027; B61L 15/0036; B61C 17/12
USPC ..... 701/19, 20, 21, 410, 533, 537, 200, 209; 340/573.4, 990; 455/456.5, 552.1
See application file for complete search history.

(56) References Cited

U.S. PATENT DOCUMENTS 5,802,492 A * 9/1998 DeLorme et al. ......... 455/456.5
5,920,697 A * 7/1999 Masters et al. ............... 709/219
(Continued)

OTHER PUBLICATIONS

Latos et al., A Framework for dynamic car and taxi pools with the use of Positioning Systems, 2009, IEEE, p. 385-391.*

(Continued)

*Primary Examiner* — McDieunel Marc

(57) ABSTRACT

Computationally implemented methods and systems that are designed for receiving a request for transporting one or more end users towards a destination location; presenting at least one or more portions of a travel plan for facilitating the one or more end users to travel to the destination location from a starting location, the travel plan identifying at least two route legs including at least one transport route leg that calls for at least one transportation vehicle unit to transport the one or more end users over the transport route leg; and transmitting a request for one or more transportation vehicle units to rendezvous with the one or more end users at a rendezvous location in order to transport the one or more end users over the at least one transport leg. In addition to the foregoing, other aspects are described in the claims, drawings, and text.

41 Claims, 28 Drawing Sheets

Related U.S. Application Data

(60) Provisional application No. 61/989,394, filed on May 6, 2014.

(56) References Cited

U.S. PATENT DOCUMENTS

| | | | |
|---|---|---|---|
| 6,321,158 B1* | 11/2001 | DeLorme et al. | 701/426 |
| 7,312,712 B1* | 12/2007 | Worrall | 340/573.4 |
| 7,840,427 B2 | 11/2010 | O'Sullivan | |
| 7,957,871 B1 | 6/2011 | Echeruo | |
| 8,626,366 B2* | 1/2014 | Noffsinger et al. | 701/21 |
| 8,688,532 B2 | 4/2014 | Khunger et al. | |
| 8,775,070 B1 | 7/2014 | Bhatia | |
| 8,831,677 B2* | 9/2014 | Villa-Real | 455/552.1 |
| 2002/0186144 A1 | 12/2002 | Meunier | |
| 2003/0040944 A1 | 2/2003 | Hileman | |
| 2009/0005963 A1 | 1/2009 | Jarvinen | |
| 2009/0248587 A1 | 10/2009 | Van Buskirk | |
| 2010/0280884 A1 | 11/2010 | Levine et al. | |
| 2010/0332131 A1* | 12/2010 | Horvitz et al. | 701/210 |
| 2011/0059693 A1 | 3/2011 | O'Sullivan | |
| 2011/0257883 A1* | 10/2011 | Kuznetsov | 701/209 |
| 2011/0288762 A1* | 11/2011 | Kuznetsov | 701/200 |
| 2012/0041675 A1 | 2/2012 | Juliver et al. | |
| 2012/0112696 A1* | 5/2012 | Ikeda et al. | 320/109 |
| 2012/0253654 A1 | 10/2012 | Sun et al. | |
| 2013/0054139 A1 | 2/2013 | Bodin et al. | |
| 2013/0131909 A1 | 5/2013 | Cooper et al. | |
| 2013/0158861 A1 | 6/2013 | Lerenc | |
| 2013/0158869 A1 | 6/2013 | Lerenc | |
| 2013/0226365 A1 | 8/2013 | Brozovich | |
| 2014/0094998 A1* | 4/2014 | Cooper et al. | 701/2 |
| 2014/0173511 A1 | 6/2014 | Lehmann et al. | |
| 2015/0006005 A1 | 1/2015 | Yu et al. | |
| 2015/0006072 A1 | 1/2015 | Goldberg et al. | |
| 2015/0019132 A1* | 1/2015 | Gusikhin et al. | 701/537 |
| 2015/0025932 A1 | 1/2015 | Ross et al. | |
| 2015/0278759 A1 | 10/2015 | Harris et al. | |
| 2015/0294431 A1 | 10/2015 | Fiorucci | |
| 2015/0323333 A1 | 11/2015 | Lord et al. | |
| 2015/0323336 A1 | 11/2015 | Lord et al. | |
| 2015/0324717 A1 | 11/2015 | Lord et al. | |
| 2015/0324729 A1 | 11/2015 | Lord et al. | |
| 2015/0324735 A1 | 11/2015 | Lord et al. | |
| 2015/0324944 A1 | 11/2015 | Lord et al. | |
| 2015/0324945 A1 | 11/2015 | Lord et al. | |
| 2015/0325128 A1 | 11/2015 | Lord et al. | |

OTHER PUBLICATIONS

Shahzada et al. Dynamic Vehicle Navigation: An A Algorithm Based Approach Using Traffic and Road Information, IEEE, 2011, p. 514-518.*

Dillengurg et al., The Intelligent Travel Assistant, IEEE, p. 2002, p. 691-696.*

Guc et al., Real-time, Scalable Route Planning using a Stream-Processing Infrastructure, IEEE, p. 2010, p. 986-991.*

Boufraied, Amine; "A Diagnostic Approach for Advanced Tracking of Commercial Vehcles With Time Window Constraints"; IEEE Transaction on Intelligent Transportation Systems; bearing a date of Sep. 2013; pp. 1470-1479; vol. 14, No. 3; IEEE.

Fougeres et al; "A Push Service for Carpooling"; bearing a date of 2012 (created on Dec. 8, 2015); IEEE; 2012 IEEE International Conference on Green Computing and Communications, Conference on Internet of Things, and Conference on Cyber, Physical and Social Computing; pp. 685-691; IEEE Computer Society.

Megalingam et al; "Automated Wireless Carpooling System for an Eco-Friendly Travel"; bearing a date of 2011 (created on Dec. 8, 2015); IEEE; pp. 325-329.

Vaughn-Nichols, Steven J.; "Will Mobile Computing's Future be Location, Location, Location?"; IEEE; bearing a date of Feb. 2009; pp. 14-17; IEEE Computer Society.

Amey et al.; "'Real-Time' Ridesharing—The Opportunities and Challenges of Utilizing Mobile Phone Technology to Improve Rideshare Services"; Paper submitted to the 2011 Transportation Research Board Annual Meeting; bearing a date of Aug. 1, 2010; pp. 1-17.

* cited by examiner

204\* Travel Plan Providing Module

304 Travel Plan Creating Module

306 Rendezvous Location Ascertaining Module

308 Rendezvous Arrival Time Estimating Module

310 Intermediate Location Arrival Time Estimating Module

316 Distance Minimizing Travel Plan Developing Module

318 Travel Time Minimizing Travel Plan Developing Module

320 Travel Cost Minimizing Travel Plan Developing Module

322 Mass Transit/Ferry Preference Compliant Travel Plan Developing Module

324 Walking/Bicycling Preference Compliant Travel Plan Developing Module

326 Geographic Preference Compliant Travel Plan Developing Module

312 Travel Plan Request Transmitting Module

313 End User Preference Data Transmitting Module

314 Travel Plan Receiving Module

330 Travel Plan Transmitting Module

FIG. 3B

Starting Location:   213 Elm St. Bainbridge Island, WA
Destination Location: 1425 Bellevue Way, Bellevue, WA
Preferred Arrival Time: 10:30 AM Travel Plan Starting Time: 8:05 AM

---

Route Leg 1      Mode: Walking

Route Leg Starting point: 213 Elm St. – Depart at 8:05

Route Leg End point: Pier 4
Travel Time: 18 minutes
Expected Arrival Time: 8:23 AM

---

Route Leg 2      Mode: Ferry

Route Leg Starting Point: 8:40 Ferry from Pier 4

Route Leg End point: Ferry Terminal Exit at 1233 Alaskan Way
Travel Time: 1 hour 10 minutes
Expected Arrival Time: 9:50 AM

---

Route Leg 3          Mode: Transportation Vehicle Unit

Route Leg Pickup Point: Ferry Terminal Exit at 1233 Alaskan Way
Pickup time: 9:55 AM Transportation Vehicle Unit:
Vehicle: 2016 Toyota Highlander – Green
Driver: Jake White  Rating: 5
Lic. Plate: GHX 2133

Route Leg End point: 1425 Bellevue Way, Bellevue, WA
Travel Time: 30 minutes

---

Estimated Arrival Time at Destination Location: 10:25 AM

400a Travel Plan

FIG. 4A

Starting Location: 213 Elm St. Bainbridge Island, WA
Destination Location: 1425 Bellevue Way, Bellevue, WA
Preferred Arrival Time: 10:30 AM Travel Plan Starting Time: 8:05 AM 420b

Route Leg 1　　　　　　　Mode: Walking

Route Leg Starting point: 213 Elm St. – Depart at 8:05

Planned Travel Route:
1. Go 500 yards east on Elm St., turn right onto $1^{st}$ Street.
2. Go 425 yards south on $1^{st}$ St. and then turn right onto Oak St.
3. Go 465 yards west on Oak St. – Arrive at Pier 4

Route Leg End point: Pier 4
Travel time: 18 minutes
Expected Arrival Time: 8:23 AM

Route Leg 2　　　　　　　Mode: Ferry/walking

Route Leg Starting point: pier 4.

Planned Travel Route:
1. Get on 8:40 ferry to Seattle
2. Disembark at pier 65 in Seattle
3. Walk to Ferry terminal exit at 1233 Alaskan Way.

Route Leg End point: Ferry terminal exit at 1233 Alaskan Way
Travel Time: 1 hour 10 minutes
Expected Arrival Time: 9:50 AM

Route Leg 3　　　　Mode: Transportation Vehicle Unit

Route Leg Pickup Point: Ferry terminal exit at 1233 Alaskan Way
Pickup Time: 9:55 AM Transportation Vehicle Unit:
Vehicle: 2016 Toyota Highlander – Green
Driver: Jake White
Lic. Plate: GHX 2133
Route Leg End point: 11425 Bellevue Way, Bellevue, WA
Travel Time: 30 minutes

Estimated Arrival Time at Destination Location: 10:25 AM

400b Travel Plan

FIG. 4B

Starting Location:    1425 Bellevue Way, Bellevue, WA
Destination Location: 213 Elm St. Bainbridge Island, WA
Preferred Arrival Time: 16:30 PM Travel Plan Starting Time: 3:30 AM

Route Leg 1            Mode: Transportation Vehicle Unit

Route Leg Pickup Point: 1425 Bellevue Way, Bellevue, WA
Pickup time: 3:30 PM

Transportation Vehicle Unit:
Vehicle: 2016 Taurus
Driver: Donald Black  Rating: 5
Lic. Plate: VHS 2211

Route Leg End point: Ferry Terminal Entrance at 1233 Alaskan Way
Travel Time: 45 minutes
Expected Arrival Time: 4:15 PM

Route Leg 2        Mode: Ferry

Route Leg Starting Point: Pier 56 Seattle Port 5:00 PM Ferry to Bainbridge Island, WA Route Leg End point: Pier 4 Bainbridge Island
Travel Time: 1 hour 10 minutes
Expected Arrival Time: 6:10 PM

Route Leg 3        Mode: Walking

Route Leg Starting point: Pier 4 Bainbridge Island
Route Leg End point: 213 Elm St
Travel time: 18 minutes

Estimated Arrival Time at Destination Location: 6:28 PM

400f Travel Plan

FIG. 4F

Starting Location: 213 Main St., Portland, OR
Destination Location: 1425 Bellevue Way, Bellevue, WA
Preferred Arrival Time: 11:00 AM Travel Plan Starting Time: 7:15 AM Route Leg 1             Mode: Transportation Vehicle Unit Route Leg Pickup Point: 213 Main St., Portland, OR
Pickup time: 8:15 AM Transportation Vehicle Unit:
Vehicle: 2012 Chrysler Impala – Red with White Stripe
Driver: David Green  Rating: 5
Lic. Plate: CAN 221

Route Leg End point: 2456 Ash Drive, Tacoma, WA
Travel Time: 1:30 minutes
Expected Arrival Time: 9:45 AM Route Leg 2             Mode: Transportation Vehicle Unit Route Leg Pickup Point: 2456 Ash Drive, Tacoma, WA
Pickup time: 9:50 AM Transportation Vehicle Unit:
Vehicle: 2016 Toyota Highlander – Green
Driver: Jake White  Rating: 5
Lic. Plate: GHX 2133

Route Leg End point: 1425 Bellevue Way, Bellevue, WA
Travel Time: 60 minutes

Estimated Arrival Time at Destination Location: 10:50 AM

400g Travel Plan

FIG. 4G

SYSTEMS AND METHODS FOR PROVIDING AT LEAST A PORTION OF A TRAVEL PLAN THAT CALLS FOR AT LEAST ONE TRANSPORTATION VEHICLE UNIT

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 61/989,394 titled RIDE-SHARING SCENARIOS, naming Richard T. Lord and Robert W. Lord as inventors, filed May 6, 2014, which was filed within the twelve months preceding the filing date of the present application or is an application of which a currently co-pending application is entitled to the benefit of the filing date.

The present application constitutes a continuation-in-part of U.S. patent application Ser. No. 14/318,182, entitled METHODS, SYSTEMS, AND DEVICES FOR PROVIDING TRANSPORTATION SERVICES, naming Richard T. Lord, Robert W. Lord, Nathan P. Myhrvold, and Clarence T. Tegreene, as inventors, filed 27 Jun. 2014.

The present application constitutes a continuation-in-part of U.S. patent application Ser. No. 14/329,451, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 11 Jul. 2014, which is currently co-pending or is an application of which a currently co-pending application is entitled to the benefit of the filing date, and which is a continuation of U.S. patent application Ser. No. 14/328,002, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 10 Jul. 2014.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, receiving a request for transporting one or more end users towards a destination location, and presenting at least one or more portions of a travel plan for facilitating the one or more end users to travel to the destination location from a starting location, the travel plan identifying at least two route legs including at least one transport route leg that calls for at least one transportation vehicle unit to transport the one or more end users over the transport route leg. In various implementations, at least one of the facilitating or directing is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving a request for transporting one or more end users towards a destination location, and means for presenting at least one or more portions of a travel plan for facilitating the one or more end users to travel to the destination location from a starting location, the travel plan identifying at least two route legs including at least one transport route leg that calls for at least one transportation vehicle unit to transport the one or more end users over the transport route leg. In addition to the foregoing, other system aspects are described in the claims, drawings, and text forming a part of the disclosure set forth herein.

In one or more various aspects, a system includes, but is not limited to, circuitry for receiving a request for transporting one or more end users towards a destination location, and circuitry for presenting at least one or more portions of a travel plan for facilitating the one or more end users to travel to the destination location from a starting location, the travel plan identifying at least two route legs including at least one transport route leg that calls for at least one transportation vehicle unit to transport the one or more end users over the transport route leg. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, receiving a request for transporting one or more end users towards a destination location, and presenting at least one or more portions of a travel plan for facilitating the one or more end users to travel to the destination location from a starting location, the travel plan identifying at least two route legs including at least one transport route leg that calls for at least one transportation vehicle unit to transport the one or more end users over the transport route leg. In addition to the foregoing, other computer program product aspects are described in the claims, drawings, and text forming a part of the disclosure set forth herein.

In one or more various aspects, a system includes, but is not limited to, a travel plan providing module configured to provide at least one or more portions of a travel plan for facilitating the one or more end users to travel to the destination location from a starting location, the travel plan identifying at least two route legs including at least one transport route leg that calls for at least one transportation vehicle unit to transport the one or more end users over the transport route leg; and a transportation vehicle unit request transmitting module configured to transmit a request for one or more transportation vehicle units to rendezvous with the one or more end users at a rendezvous location in order to transport the one or more end users over the at least one transport leg.

In one or more aspects, a hardware system includes, but is not limited to, circuitry for providing at least one or more portions of a travel plan for facilitating the one or more end users to travel to the destination location from a starting location, the travel plan identifying at least two route legs including at least one transport route leg that calls for at least one transportation vehicle unit to transport the one or more end users over the transport route leg, and circuitry for transmitting a request for one or more transportation vehicle units to rendezvous with the one or more end users at a rendezvous location in order to transport the one or more end users over the at least one transport leg.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3B shows another perspective of the travel plan providing module 204* of FIGS. 2A and 2B (e.g., the travel plan providing module 204' of FIG. 2A or the travel plan providing module 204" of FIG. 2B) in accordance with various embodiments.

FIG. 4A illustrates content of an exemplary travel plan in accordance with some embodiments.

FIG. 4B illustrates content of another exemplary travel plan in accordance with some embodiments.

FIG. 4F illustrates content of still another exemplary travel plan in accordance with some embodiments.

FIG. 4G illustrates content of still another exemplary travel plan in accordance with some embodiments.

DETAILED DESCRIPTION

Figure 1:
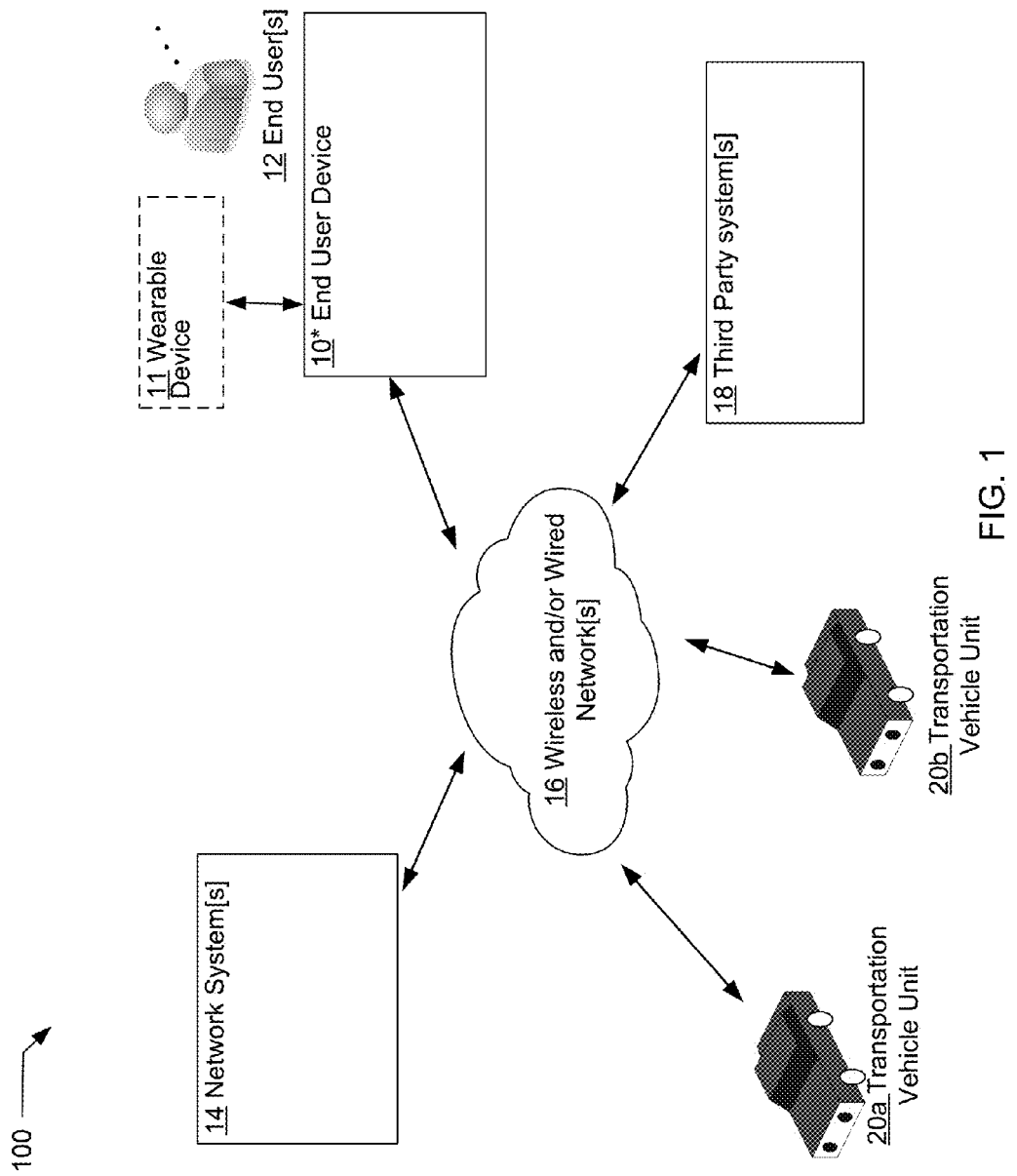
FIG. 1 illustrates an end user device 10* operating in an exemplary environment

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, (as of Jun. 5, 2012, 21:00 GMT). In order to facilitate human comprehension, in many instances, high-level programming languages resemble or even share symbols with natural languages. See, e.g., Wikipedia, Natural language, (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU) the best known of which is the microprocessor. A modem microprocessor will often contain more than one hundred million logic gates in its many logic circuits (and often more than a billion transistors). See, e.g., Wikipedia, Logic gates, (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, (as of Jun. 5, 2012, 21:04 GMT). Thus, programs written in machine language- which may be tens of millions of machine language instructions long - are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as INTEL Corporation's and/or CROSSBOW Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

One of the newest trends in the field of transportation/commuting particularly in, for example, urban settings is the development of transportation networking services provided by web-based companies such as Uber and Lyft that allow users to retain drivers/vehicles for transportation serves through, for example, mobile applications. The increasingly popularity of such ridesharing services have already made some of the early entrants in this new field household names. As with many new technological ventures, the functionalities provided through such services are somewhat limited. However there appears to be ample opportunities for adding new and value adding functionalities to such services (as well as to more traditional transportation services such as Taxi services) in order to provide more robust transportation networking systems.

In accordance with various embodiments, systems and methods are provided that are designed to, among other things, present or provide at least one or more portions of a travel plan for facilitating one or more end users to travel to a destination location from a starting location, the travel plan identifying at least two route legs including at least one transport route leg that calls for at least one transportation vehicle unit to transport the one or more end users over the transport route leg. In some embodiments, the one or more portions of the travel plan to be presented may be one or more route legs of the travel plan. For these embodiments, the presentation of the at least one or more portions of the travel plan may include developing the at least one or more portions of the travel plan. In alternative embodiments, however, the presentation of the at least one or more portions of the travel plan may involve obtaining or retrieving the at least one or more portions of the travel plan from an external source (e.g., a server[s] or "the cloud"). For these embodiments, the systems and methods may be implemented at an end user device (e.g., a desktop computer, a mobile device such as a Smartphone or tablet computer, and so forth).

In various embodiments, the presentation of the one or more portions of the travel plan may be in response to receiving a request for transporting the one or more end users towards the destination location. For these embodiments, the request that may be received may be a request that specifically requests for the travel plan for traveling to the destination location. In other embodiments, however, the request that may be received may be a request that specifically requests for transportation for at least a portion of the overall trip to the destination location.

In various embodiments, the systems and methods, in addition to being designed to present or provide the one or more portions of a travel plan for facilitating the one or more end users to travel to the destination location from the starting location, may be designed to transmit a request that requests that one or more transportation vehicle units rendezvous with the one or more end users at a rendezvous location in order to transport the one or more end users over the at least one transport route leg of the travel plan. In some embodiments, the transmission of the request may be in response to detecting that at least one of the one or more end users is In embodiments where the systems and methods develop the at least one or more portions of the travel plan, the systems and methods may determine when and where will the at least one transportation vehicle unit (e.g., a passenger vehicle such as an automobile with a human or robotic driver) be rendezvousing with the one or more end users in order to transport the one or more end users over at least one leg (herein "route leg" or more particular "transport route leg") of the travel plan. For purposes of the following description, a "travel plan" may be in reference to a scheme or a blueprint for one or more end users to reach a destination location from a starting location (which, in some cases, may be the current location of the one or more end users).

In various embodiments, a travel plan may identify two or more route legs including the mode or modes of transportation (e.g., transportation vehicle unit, walking, bicycling, ferry, mass transit, and so forth) used for traveling over the two or more different route legs. In some cases, a travel plan may identify a rendezvous location and/or rendezvous time for one or more end users to rendezvous with at least one transportation vehicle unit for transport over at least a portion of at least one route leg of the travel plan. In some cases, a travel plan may provide a planned travel route (e.g., a detailed travel scheme that identifies specific streets, roads, shipping lanes, turns, travel distances, and so forth) for traveling at least a portion (e.g., a route leg) of the overall travel route between the starting location and the destination location. Note that in various embodiments, a planned travel route is not limited to planned routes through city streets/highways but instead may also be related to planned routes over shipping lanes, walking/bicycle trails, and so forth.

In some embodiments, a travel plan may call for (e.g., plan or schedule for) multiple transportation vehicle units to transport the one or more end users over different route legs of a travel plan. Note that and as briefly indicated above a route leg of a travel plan that calls for a transportation vehicle unit to transport one or more end users over at least a portion of the route leg may be referred to herein as a "transport route leg." Also for purposes of the following description, a "transportation vehicle unit" may include at least a transportation vehicle and a human or robotic driver. A transportation vehicle, for purposes of this description, may be in reference to a passenger automobile (e.g., gas or electrical vehicle) that is not assigned to do a set route[s] like metro buses or commuter trains. In some cases, a transportation vehicle unit may further include a transport computing device (a dedicated computing device or a general purpose mobile device such as a Smartphone or a tablet computer running one or more specialized applications) for, among other things, receiving directives/instructions for rendezvousing with and transporting one or more end users in accordance with a travel plan.

Turning now to FIG. 1, which illustrates an end user device 10* operating in an exemplary environment 100. In various embodiments, the various operations and functionalities to be described herein may be implemented by the end user device 10*. The end user device 10* may be a personal computing device such as a desktop computer, a laptop computer, a mobile device such as a Smartphone or tablet computer, and so forth. Note that for purposes of the following description "*" represents a wildcard. Thus, references in the following description to, for example, "end user device 10*" may be in reference to the end user device 10' of FIG. 2A, as well as to the end user device 10" of FIG. 2B, which are two different implementations of the end user device 10* of FIG. 1.

As further illustrated in FIG. 1, the end user device 10* may communicate with one or more network systems 14, one or more transportation vehicle units 20* (e.g., transportation vehicle unit 20a and transportation vehicle unit 20b), and/or one or more third party systems 18 via one or more wireless and/or wired networks 16. The one or more wireless and/or wired networks 16 may comprise of, for example, one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth.

In some embodiments, the end user device 10* may interface with at least one of the one or more end users 12 via a wearable device 11 (e.g., an augmented reality device such as Google Glass or a Smartwatch). The end user device 10* may communicate with the wearable device 11 via wireless (e.g., Bluetooth) or wired connection. In various embodiments, the end user device 10* may be associated with (e.g., being owned or in the possession) of at least one of one or more end users 12. The one or more network systems 14 may be one or more network devices such as one or more network servers that may provide various functionalities including developing and/or providing at least one or more portions of a travel plan to the end user 12.

The one or more network systems 14 may be a network system such as server or workstation, or a plurality of network devices such as servers, workstations, storage, and so forth (e.g., "the cloud"). In some embodiments, the one or more network systems 14 may be designed to develop and to transmit to the end user device 10* at least one or more portions of a travel plan to facilitate one or more end users 12 to travel to a destination location from a starting location upon, for example, receiving a request for the at least one or more portion of the travel plan from the end user device 10*. For these embodiments, the one or more network systems 14 may further be in communication with one or more transportation vehicle units 20* in order to, for example, direct the one or more transportation vehicle units 20* to rendezvous with the one or more end users 12 so that the one or more end users 12 can be transported over a transport route leg of a travel plan.

In various embodiments, the end user device 10* may communicate with one or more third party systems 18 in order to obtain certain information (e.g., weather, traffic conditions, ferry or metro schedules, train schedules) and/or for making certain reservations (e.g., ferry or train reservations) from one or more third parties. Such information may be useful for facilitating the end user device 10* for presenting or providing travel plans for reaching destination locations. That is, in various embodiments, the end user device 10* may be designed to present (and in some cases, to develop) at least one or more portions of a travel plan for facilitating one or more end users 12 to travel to a destination location from a starting location, the travel plan identifying at least two route legs including at least one transport route leg that calls for (e.g., plans for) at least one transportation vehicle unit 20* to transport the one or more end users 12 over the transport route leg.

In some cases, the presenting or providing of at least the one or more portions of the travel plan may be in response to the end user device 10* receiving input (e.g., via user interface or via wearable device 11) from at least one of one or more end users 12 a request for transporting the one or more end users 12 towards a destination location. In some cases, such a received request may be a request that specifically requests for a travel plan for traveling to the destination location, while in other cases, such a request may specifically request for transportation for at least a portion of the overall trip to the destination location.

Based, at least in part, on the travel plan, the end user device 10* or the one or more network systems 14 (as a result of a request received from the end user device 10*) may request/direct one or more transportation vehicle units 20* to a rendezvous location to rendezvous with the one or more end users 12 in order to transport the one or more end users 12 over at least a portion of a transport route leg of the travel plan. In some cases, the one or more transportation vehicle units 20* may only be directed to rendezvous with the one or more end users 12 only upon detection that at least one of the one or more end users 12 (e.g., the end user 12 who is carrying the end user device 10* having a GPS system) is in the proximate vicinity of the rendezvous location.

Figure 2A:
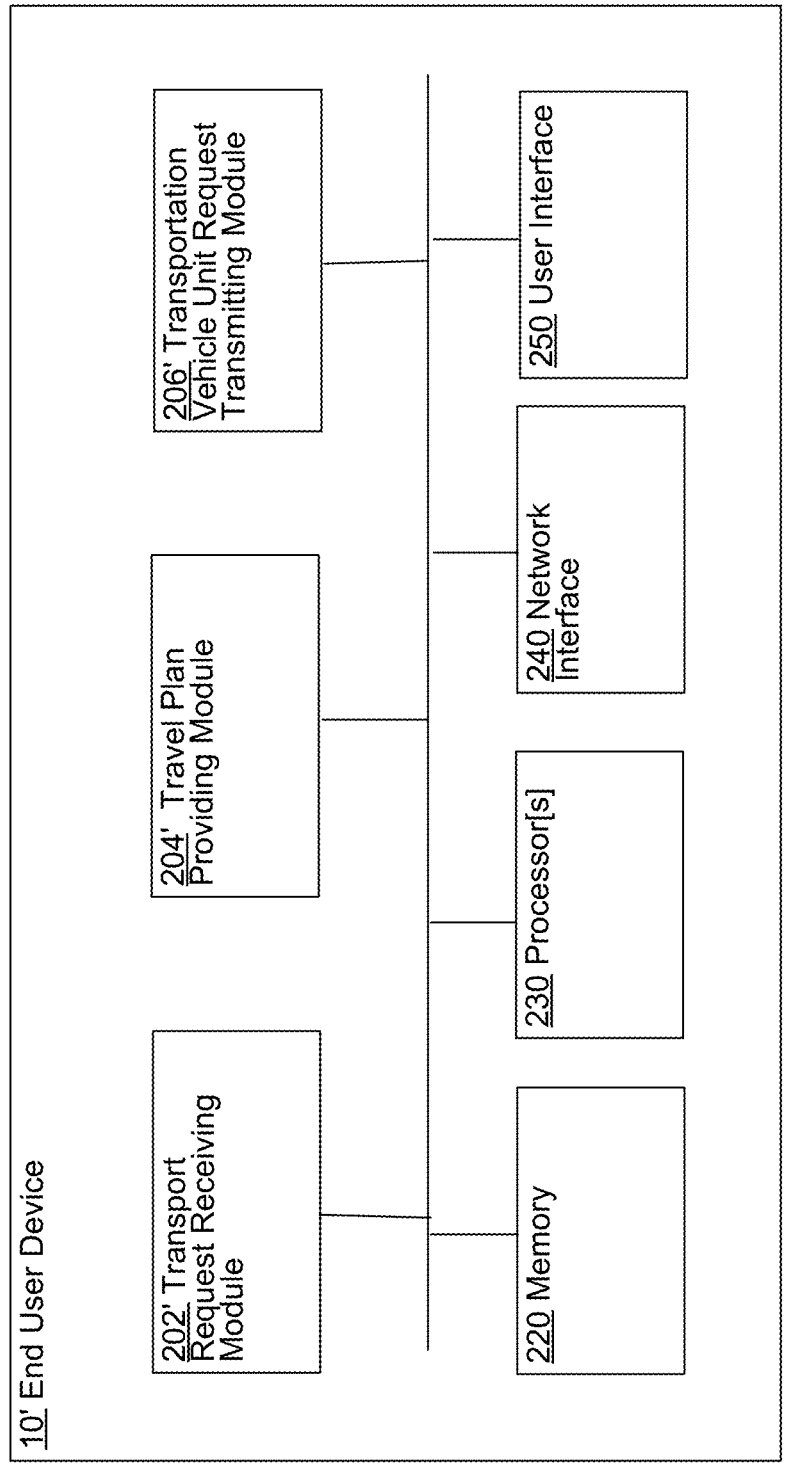
FIG. 2A shows a high-level block diagram of a particular implementation of the end user device 10* of FIG. 1 (illustrated in FIG. 2A as end user device 10').
Figure 2B:
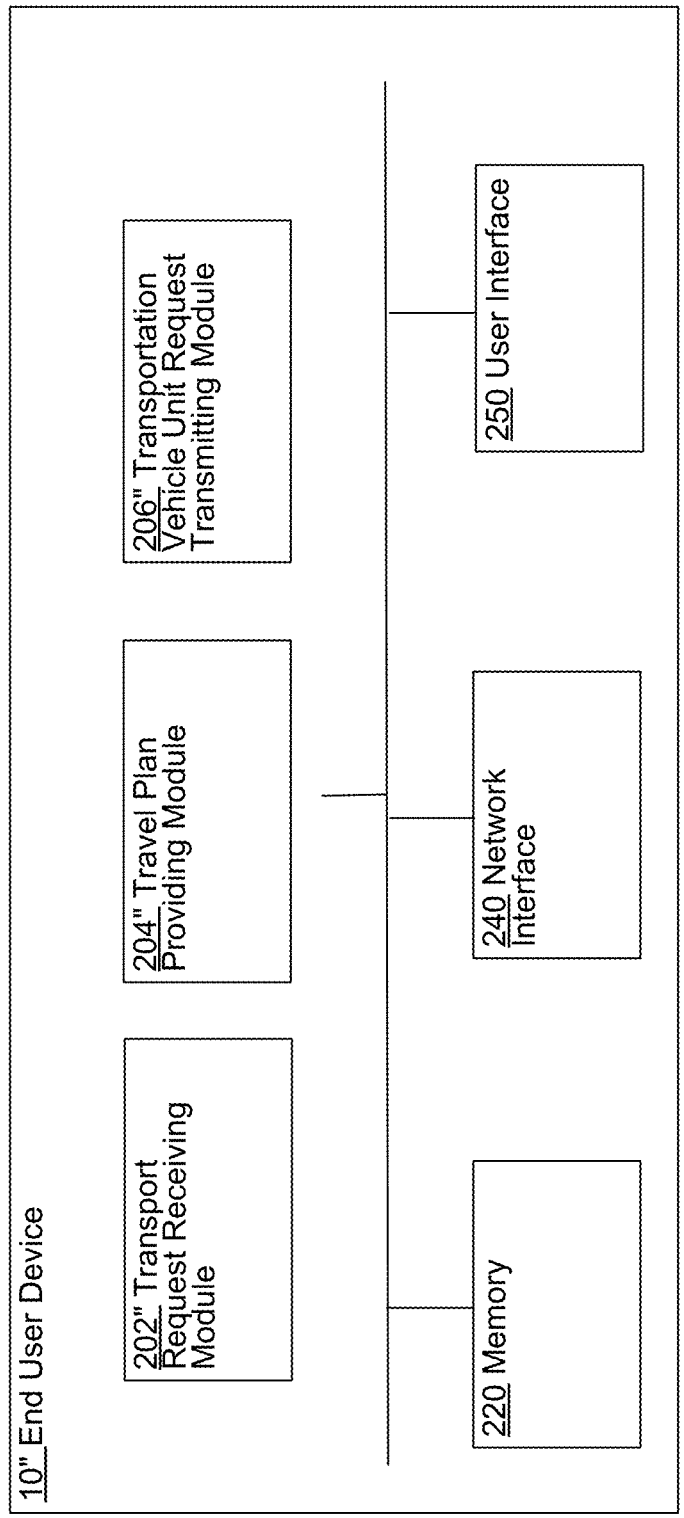
FIG. 2B shows another high-level block diagram of another implementation of the end user device 10* of FIG. 1 (illustrated in FIG. 2B as end user device 10").

Referring now to FIGS. 2A and 2B, which illustrate two block diagrams representing two different implementations of the end user device 10* of FIG. 1. In particular, and as will be further described herein, FIG. 2A illustrates an end user device 10' that is the "hardwired" or "hard" implementation of the end user device 10* that can implement the operations and processes to be described herein. The end user device 10' of FIG. 2A includes certain logic modules including a transport request receiving module 202', a travel plan providing module 204' and a transportation vehicle unit request transmitting module 206' that are implemented using purely hardware or circuitry components (e.g., application specific integrated circuit (or ASIC). In contrast, FIG. 2B illustrates an end user device 10" that is the "soft" implementation of the end user device 10' of FIG. 2A in which certain logic modules including a transport request receiving module 202", a travel plan providing module 204" and a transportation vehicle unit request transmitting module 206" are implemented using programmable electronic circuitry (e.g., one or more processors 230 such as one or more microprocessors, controllers, field programmable gate array or FPGA, etc.) executing one or more programming instructions (e.g., software).

The embodiments of the end user device 10* illustrated in FIGS. 2A and 2B (e.g., the end user device 10' of FIG. 2A and the end user device 10" of FIG. 2B) are two extreme implementations of the end user device 10* in which all of the logic modules (e.g., the transport request receiving module 202', the travel plan providing module 204' and the transportation vehicle unit request transmitting module 206') are implemented using purely hardware solutions (e.g., circuitry such as ASIC) as illustrated in FIG. 2A or in which all of the logic modules (e.g., the transport request receiving module 202", the travel plan providing module 204" and the transportation vehicle unit request transmitting module 206") are implemented using software solutions (e.g., programmable instructions being executed by programmable circuitry such as one or more processors) as illustrated in FIG. 2B. Since there are many ways of combining hardware, software, and/or firmware in order to implement the various logic modules (e.g., the transport request receiving module 202*, the travel plan providing module 204* and the transportation vehicle unit request transmitting module 206*), only the two extreme implementations (e.g., the purely hardware solution as illustrated in FIG. 2A and the software solution of FIG. 2B) are illustrated here. It should be noted here that with respect to the "soft" implementation illustrated in FIG. 2B, hardware in the form of programmable circuitry such as one or more processors 230 (e.g., microprocessors, controllers, FPGAs) are still needed in order to execute the software. Further details related to the two implementations of end user device 10* illustrated in FIGS. 2A and 2B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 2A, which illustrates that the end user device 10' in addition to the transport request receiving module 202', the travel plan providing module 204' and the transportation vehicle unit request transmitting module 206' may further include one or more processors 230 (e.g., microprocessors, controllers, FPGAs, and so forth), a network interface 240 (network interface card or NIC), and/or memory 220. In various embodiments, memory 220 may comprise of volatile and/or non-volatile memory. In some embodiments, memory 220 may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, the memory 220 may be employed to store a variety of programming instructions (e.g., software) and data including previously provided travel plans, ferry and/or mass transit schedules, end user preferences including vehicle and/or driver preferences, driver preferences including geographic preferences, and so forth.

Turning now to FIG. 2B, which illustrates an end user device 10" in which certain logic modules (the transport request receiving module 202", the travel plan providing module 204" and the transportation vehicle unit request transmitting module 206") are implemented using one or more processors 230. In addition, the end user device 10" may further include a memory 220 and a network interface 240 similar to the end user device 10' of FIG. 2A. In various embodiments, the memory 220 may store various applications and one or more computer readable programming instructions for implementing the various logic modules (e.g., the transport request receiving module 202", the travel plan providing module 204", and/or the transportation vehicle unit request transmitting module 206"). Note that although not depicted in either FIGS. 2A and 2B, the two implementations of the end user device 10* illustrated in FIGS. 2A and 2B may include other components/modules including, for example, a global positioning system (GPS), transceiver, antenna, and so forth.

In various embodiments the transport request receiving module 202* of FIG. 2A or 2B (e.g., the transport request receiving module 202' of FIG. 2A or the transport request receiving module 202" of FIG. 2B) may be configured to, among other things, receive a request for transporting one or more end users 12 towards a destination location. In contrast, the travel plan providing module 204* of FIG. 2A or 2B (e.g., the travel plan providing module 204' of FIG. 2A or the travel plan providing module 204" of FIG. 2B) may be configured to, among other things, provide at least one or more portions of a travel plan (e.g., travel plan 400* of FIG. 4A, 4B, 4F, or 4G) for facilitating the one or more end users 12 to travel to the destination location from a starting location, the travel plan 400* identifying at least two route legs including at least one transport route leg that calls for at least one transportation vehicle unit 20* to transport the one or more end users 12 over the transport route leg. Meanwhile, the transportation vehicle unit request transmitting module 206* of FIG. 2A or 2B (e.g., the transportation vehicle unit request transmitting module 206' of FIG. 2A or the transportation vehicle unit request transmitting module 206" of FIG. 2B) may be configured to, among other things, transmit a request for one or more transportation vehicle units 20* to rendezvous with the one or more end users 12 at a rendezvous location in order to transport the one or more end users 12 over the at least one transport leg of the travel plan 400*.

Figure 3A:
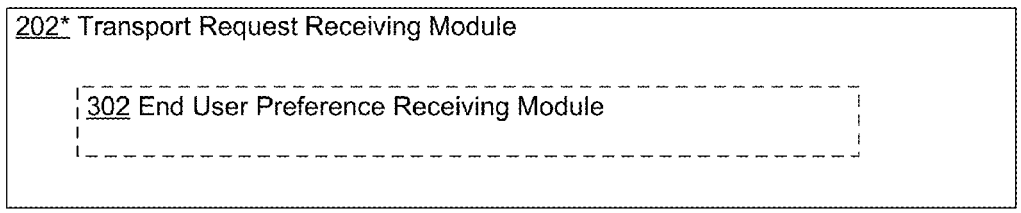
FIG. 3A shows another perspective of the transport request receiving module 202* of FIGS. 2A and 2B (e.g., the transport request receiving module 202' of FIG. 2A or the transport request receiving module 202" of FIG. 2B) in accordance with various embodiments.

Referring now to FIG. 3A illustrating a particular implementation of the transport request receiving module 202* (e.g., the transport request receiving module 202' or the transport request receiving module 202") of FIG. 2A or 2B. As illustrated, the transport request receiving module 202* may include one or more sub-logic modules in various alternative implementations. For example, in various embodiments, the transport request receiving module 202* may further include an end user preference receiving module 302. Specific details related to the transport request receiving module 202* as well as the above-described sub-module of the transport request receiving module 202* will be provided below with respect to the operations and processes to be described herein.

FIG. 3B illustrates a particular implementation of the travel plan providing module 204* (e.g., the travel plan providing module 204' or the travel plan providing module 204") of FIG. 2A or 2B. As illustrated, the travel plan providing module 204* may include one or more sub-logic modules in various alternative implementations. For example, in various embodiments, the travel plan providing module 204* may further include a travel plan creating module 304, which may further include a rendezvous location ascertaining module 306 (which may further include a rendezvous arrival time estimating module 308, an intermediate location arrival time estimating module 310, a distance minimizing travel plan developing module 316, a travel time minimizing travel plan developing module 318, a travel cost minimizing travel plan developing module 320, a mass transit/ferry preference compliant travel plan developing module 322, a walking/bicycling preference compliant travel plan developing module 324, and/or a geographic preference compliant travel plan developing module 326. The travel plan providing module 204* may further include a travel plan request transmitting module 312, an end user preference data transmitting module 313, and/or a travel plan transmitting module 330. Specific details related to the travel plan providing module 204" as well as the above-described sub-modules of the travel plan providing module 204* will be provided below with respect to the operations and processes to be described herein.

Figure 3C:
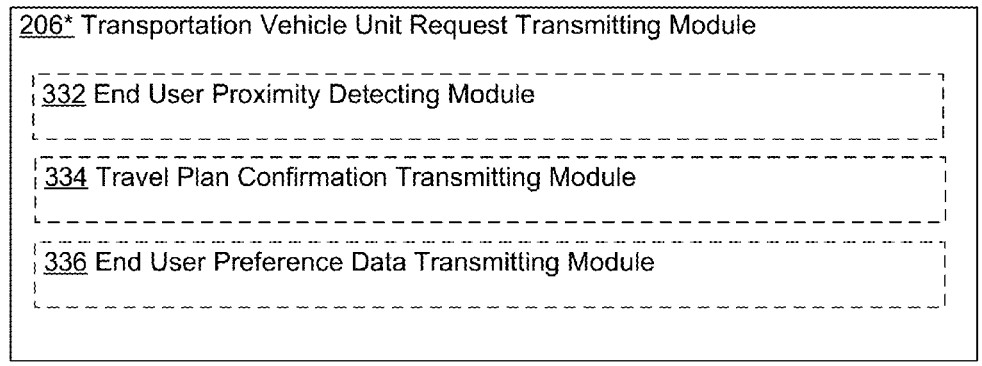
FIG. 3C shows another perspective of the transportation vehicle unit request transmitting module 206* of FIGS. 2A and 2B (e.g., the transportation vehicle unit request transmitting module 206' of FIG. 2A or the transportation vehicle unit request transmitting module 206" of FIG. 2B) in accordance with various embodiments.

Turning now to FIG. 3C illustrating a particular implementation of the transportation vehicle unit request transmitting module 206* (e.g., the transportation vehicle unit request transmitting module 206' or the transportation vehicle unit request transmitting module 206") of FIG. 2A or 2B. As illustrated, the transportation vehicle unit request transmitting module 206* may include one or more sub-logic modules in various alternative implementations. For example, in various embodiments, the transportation vehicle unit request transmitting module 206* may further include an end user proximity detecting module 332, a travel plan confirmation transmitting module 334, and/or an end user preference data transmitting module 336. Specific details related to the transportation vehicle unit request transmitting module 206" as well as the above-described sub-modules of the transportation vehicle unit request transmitting module 206* will be provided below with respect to the operations and processes to be described herein.

Referring now to FIG. 4A, which illustrates the type of data that may be included in an exemplary travel plan 400a, at least a portion of which may be presented or provided by the end user device 10* of FIG. 2A or 2B. The example travel plan 400a may be a plan to facilitate one or more end users 12 to travel from a starting location (e.g., "213 Elm St., Bainbridge Island, Wash.") to a destination location (e.g., "1425 Bellevue Way, Bellevue, Wash."), the travel plan 400a having multiple route legs including at least one route leg ("transport route leg")—route leg 3 in FIG. 4A—that calls for a transportation vehicle unit 20* to transport the one or more end users 12 over at least a portion of the transport route leg (e.g., "route leg 3" of FIG. 4A). As illustrated, the example travel plan 400a may identify the starting location (which may or may not be the current location of one of the one or more end users 12 as provided, for example, by a GPS of an end user device 10*), a destination location, and in some cases a preferred arrival time (e.g., the latest time that the one or more end users 12 may wish to arrive at the destination location—generally most people prefer to arrive early rather than late).

The travel plan 400a may further indicate a planned starting time (e.g., "8:05 AM" in FIG. 4A) for starting the planned trip from the starting location in order to reach the destination location by the preferred arrival time. Note that included at the bottom of the travel plan 400a of FIG. 4A is the estimated arrival time (e.g., "10:25 AM") at the destination location if the travel plan 400a is followed by the one or more end users 12. The travel plan 400a, as further illustrated, may identify the different route legs (e.g., route leg 1, route leg 2, and route leg 3) that the travel plan 400a may include. The mode of transportation (e.g., walking, ferry, and transportation vehicle unit) for each of the identified route legs may also be identified by the travel plan 400a. Note that route leg 3 in FIG. 4A is a "transport route leg" because it calls or plans for a transportation vehicle unit 20* to transport the one or more end users 12 over at least a portion of the route leg (e.g., route leg 3).

As illustrated in FIG. 4A, the example travel plan 400a further identifies for each route leg, a route leg starting point (or "route leg pickup point" for route leg 3), a route leg end point, travel time for the corresponding leg, and the expected arrival time (e.g., expected completion time for the route leg) at the route leg end point. Note that the example travel plan 400a includes other information related to the various route legs. For example, identifying the ferry (e.g., "8:40 Ferry"), and vehicle/driver information related to the transportation vehicle unit 20* called for by route leg 3. Note that in some cases, the specific information related to the transportation vehicle unit 20* may not be available until the one or more end users 12 are in the near vicinity of the rendezvous location for rendezvousing with the transportation vehicle unit 20*. That is, the determination or selection as to which transportation vehicle unit or units will actually be assigned to pick-up the one or more end users 12 may not be made until the one or more end users 12 are in the near vicinity of the rendezvous location so that, for example, the "best fit" (e.g., nearest to the rendezvous location and/or meets end user preferences). Transportation vehicle unit 20* may be assigned to transport the one or more end users 12.

Note further that the various headings (e.g., "Route Leg 1," "Mode:," and so forth) and subheading (e.g., "Route Leg Starting Point," "Route Leg End Point," and so forth) illustrated in FIG. 4A may not be included in an actual travel plan. That is, these headings and subheadings are provided in the illustrated travel plan 400a of FIG. 4A (as well as in the travel plans 400b, 400f, and 400g of FIGS. 4B, 4F and 4G) merely to facilitate the reader in understanding the type of information that may be included in a travel plan 400* (e.g., travel plan 400a, 400b, 400f and 400g of FIG. 4A, 4B, 4F, or 4G). Thus, an actual plan to travel to a destination location may not look anything like the example travel plan 400a of FIG. 4A (or like the travel plans 400b, 400f and 400g of FIGS. 4B, 4F, and 4G). Instead, the exemplary travel plan 400a of FIG. 4A (as well as the travel plans 400b, 400f and 400g of FIGS. 4B, 4F, and 4G) are merely presented herein in order to show the type of information that may be included in a travel plan 400*.

Figure 4C:
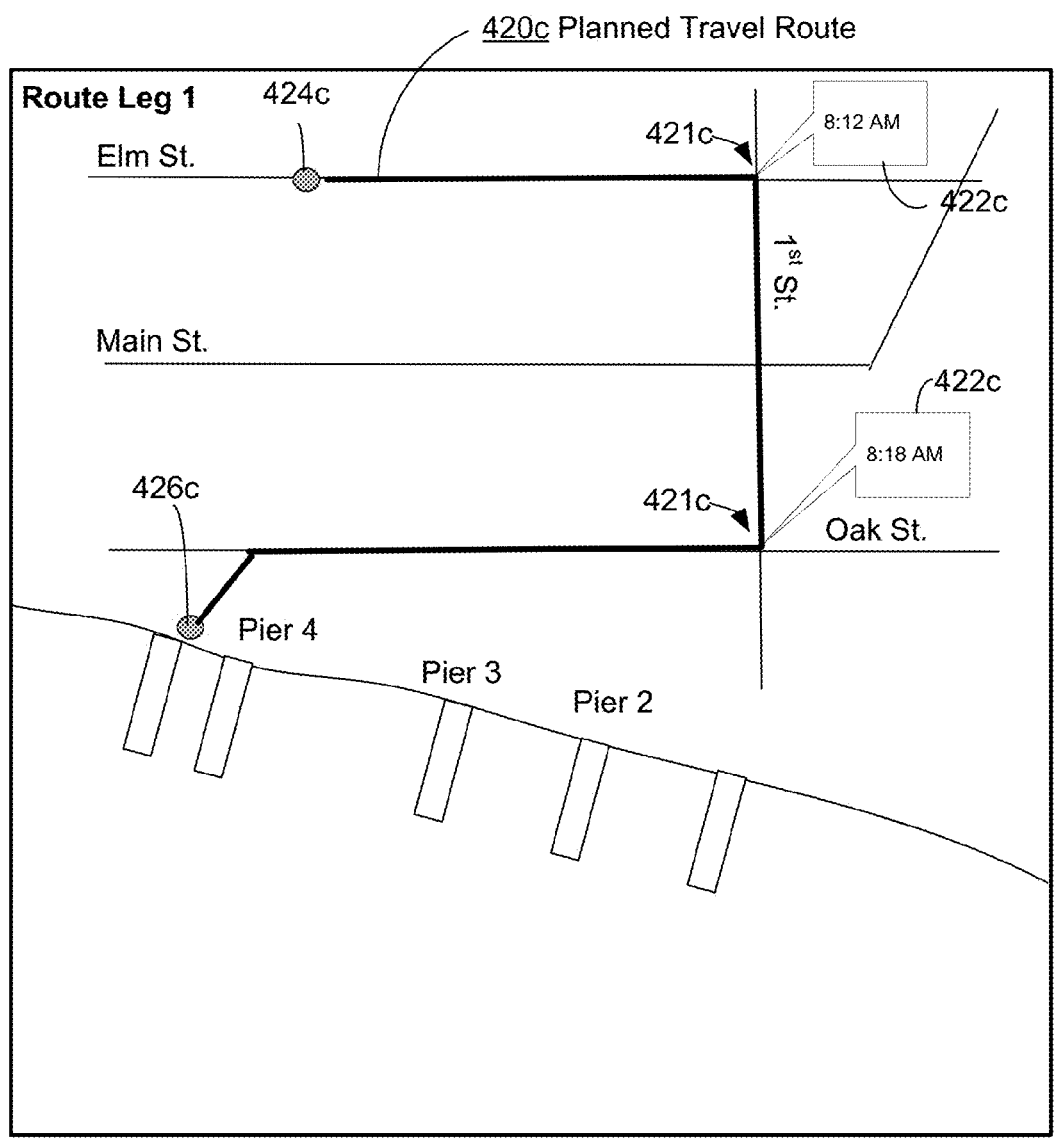
FIG. 4C illustrates an example graphical representation of a planned travel route for a route leg 1 of FIG. 4B.

As will be further illustrated, in some cases, a plan to travel to a destination location, such as the travel plan 400a of FIG. 4A, may provide specific detailed routing information that indicates, for example, turn-by-turn and street-by-street routing information for traveling at least partway to a destination location. Referring now to FIG. 4B, which illustrates another exemplary travel plan 400b with specific routing information for traveling at least partway (e.g., a route leg) to a destination location. The exemplary travel plan 400b is similar to the travel plan 400a of FIG. 4A except that for route leg 1, the travel plan 400b includes specific planned routing information in the form of planned travel route 420b, which provides street-by-street, turn-by-turn routing information for traveling from the "route leg starting point" of route leg 1 to the "route leg end point" of route leg 1. Note that the planned travel route 420b for route leg 1 of FIG. 4B is in textual form. In other implementations, however, a planned travel route 420* that identifies a detailed route of at least a portion of a route leg may be in graphical form (see, for example, planned travel route 420c, 420d, and 420e of FIGS. 4C, 4D, and 4E).

Figure 4D:
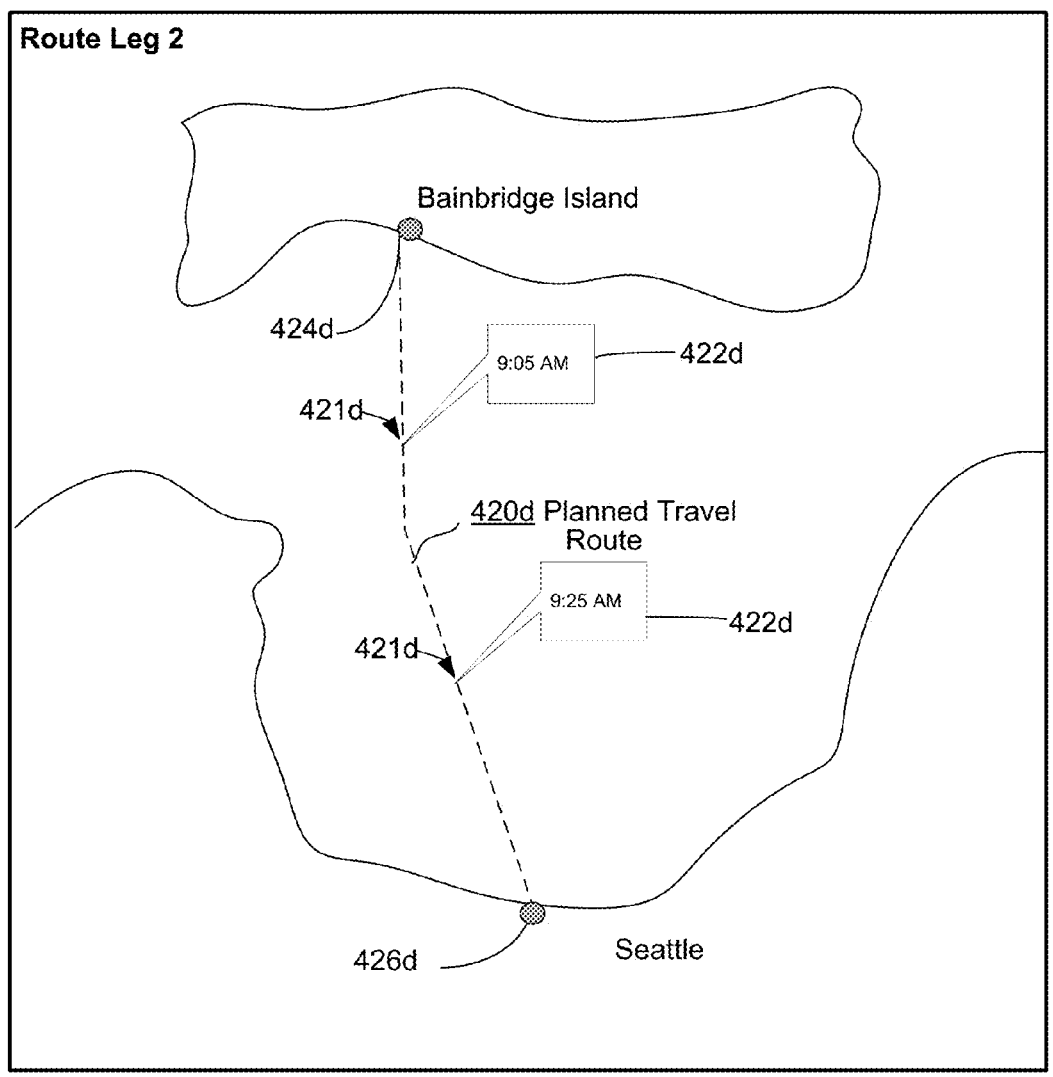
FIG. 4D illustrates an example graphical representation of a planned travel route for a route leg 2 of FIG. 4B.
Figure 4E:
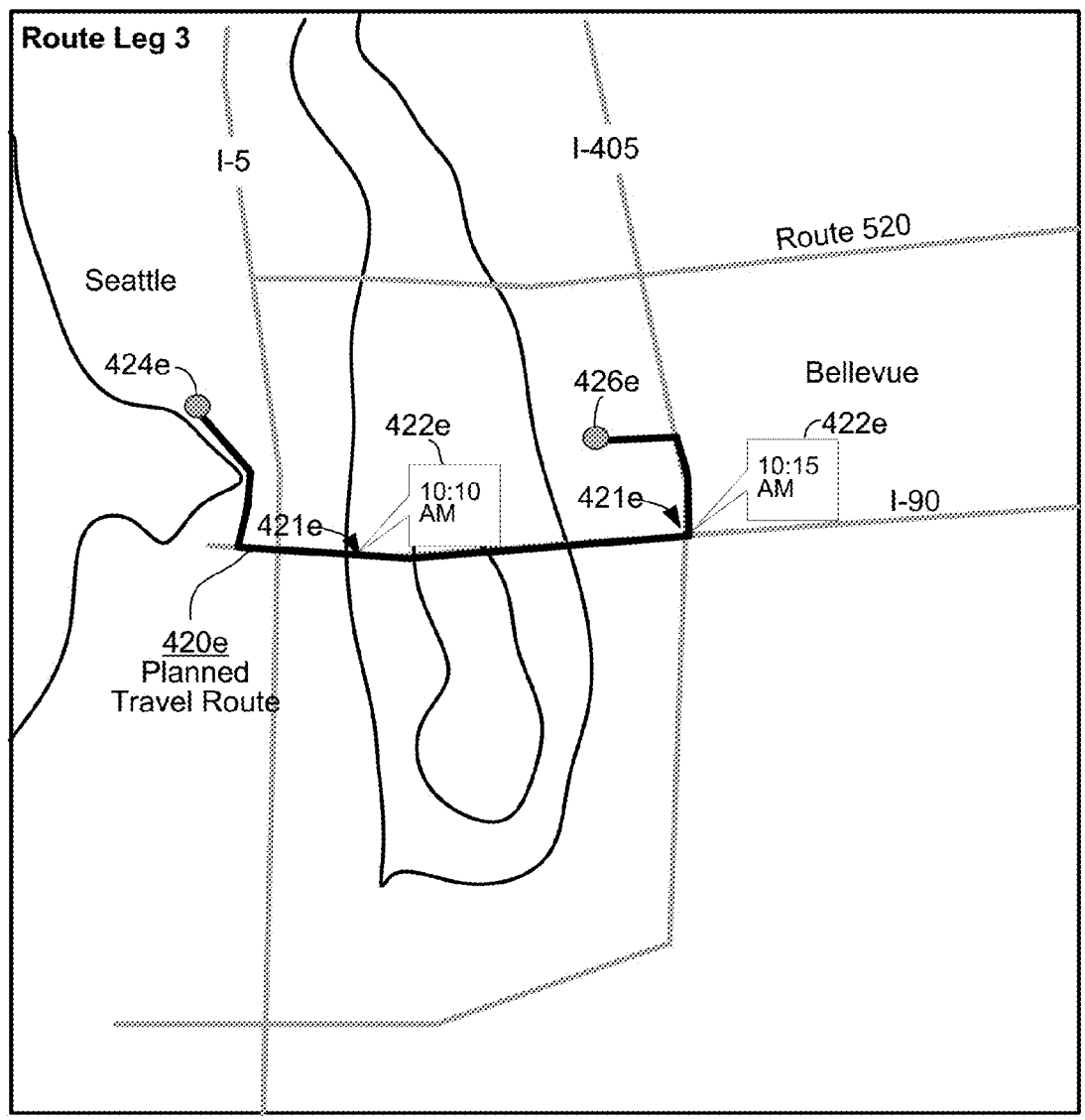
FIG. 4E illustrates an example graphical representation of a planned travel route for a route leg 3 of FIG. 4B.

Referring now to FIGS. 4C, 4D, and 4E, which illustrates planned travel routes 420*, in graphical form, for each of the route legs (e.g., route leg 1, route leg 2, and route leg 3) of travel plan 400b of FIG. 4B and which may be part of the travel plan 400b. In some embodiments, at least a portion of the planned travel routes 4C, 4D, and 4E may be presented through the end user device 10* of FIG. 2A or 2B. These planned travel routes 420* may be useful in determining whether the one or more end users 12 are traveling as planned and in accordance with the travel plan 400b (e.g., whether the one or more end users 12 will be able to reach a rendezvous location for rendezvousing with a transportation vehicle unit 20* on time and in accordance with the travel plan 400b). Turning particularly now to FIG. 4C, which depicts a planned travel route 420c for route leg 1 of the travel plan 400b of FIG. 4B. The planned travel route 420c, in one sense, is merely the graphical version of the planned travel route 420b of FIG. 4B. In addition, other information may be provided with the planned travel route 420c including route leg starting point 424c, route leg end point 426c, intermediate locations 421c along the planned travel route 420c and the planned intermediate arrival times 422c (e.g., the estimated or projected arrival times at intermediate locations in order to reach the route leg end point and to transition to the next leg, (e.g., get on a ferry, on time) for each of the intermediate locations 421c along the planned travel route 420c.

Referring now to FIG. 4D, which illustrates a planned travel route 420d (in graphical from) for route leg 2 of the travel plan 400b of FIG. 4B. The planned travel route 420d is actually the ferry route for the 8:40 ferry called for by route leg 2 of travel plan 400b of FIG. 4B. Other information may also be provided with the planned travel route 420d including the route leg starting point 424d, the route leg end point 426d, intermediate locations 421d along the planned travel route 420d and the planned intermediate arrival times 422d (e.g., estimated or projected arrival times) for each of the intermediate locations 421d.

Turning now to FIG. 4E, which illustrates a planned travel route 420e (in graphical form) for route leg 3 (e.g., "transport route leg" that calls for a transportation vehicle unit 20* to transport the one or more end users 12) of the travel plan 400b of FIG. 4B. The planned travel route 420e is the planned route for a transportation vehicle unit 20* to transport the one or more end users 12 to a route leg end point 426e (which is also the final destination location for the travel plan 400b). Other information may also be provided with the planned travel route 420e including the route leg starting point 424e, the route leg end point 426e, intermediate locations 421e along the planned travel route 420e and the planned intermediate arrival times 422e for each of the intermediate locations 421e.

The intermediate locations 421* and their associated planned intermediate arrival times 422* of each of the planned travel routes 420* of FIGS. 4C, 4D, and 4E may be useful particularly in connection with location information of the one or more end users 12. That is, the monitored location or locations of the one or more end users 12 (via GPS of the end user device 10*) when the one or more end users 12 are traveling to the destination location may be compared to the intermediate location 421* and the associated planned intermediate arrival times 422* of the planned travel routes 420* in order to determine whether the one or more end users 12 are moving along the planned travel routes 420* on time and as scheduled. And if a determination is made (e.g., determination by the end user device 10* or by a network system 14) that the one or more end users 12 have deviated from the planned travel routes 420* (because the one or more end users 12 are arriving late at the intermediate locations 421*, then adjustments may be made to the travel plan 400b (e.g., change the rendezvous location or rendezvous time for a transportation vehicle unit 20* to rendezvous with the one or more end users 12 for route leg 3).

In various embodiments, the location or locations of the one or more end users 12 (via GPS of the end user device 10*) when the one or more end users 12 are traveling to the destination location may be monitored and compared to the planned travel routes 420* in order to prompt transmission of a request for a transportation vehicle unit 20* to rendezvous with the one or more end users 12 at the rendezvous location. In various embodiments, the request may be transmitted to a network system 14. The network system 14 may then assign/direct the "best fit" transportation vehicle unit[s] 20* to the rendezvous location in order to transport the one or more end users 12 over the transport route leg of the travel plan. In various embodiments, the best-fit transportation vehicle unit[s] 20* may be based on a variety of factors including determining which transportation vehicle units 20* in the vicinity of the rendezvous location is nearest to the rendezvous location and/or which of the transportation vehicle units 20* meets the needs/preferences of the one or more end users 12.

Referring now to FIG. 4F, which illustrates another exemplary travel plan 400f that may be provided for the return trip from the trip undertaken when the travel plan 400a or 400b of FIG. 4A or 4B was executed by the one or more end users 12. As with the exemplary travel plans 400a and 400b, at least a portion of the exemplary travel plan 400f may be presented or provided through the end user device 10* of FIG. 2A or 2B. Note that because this is for a return trip, the first route leg (e.g., route leg 1) is the transport route leg that calls for a transportation vehicle unit 20* to transport the one or more end users 12 from the starting location (e.g., "1425 Bellevue Way, Bellevue, Wash.") to a route leg end point (e.g., Ferry Terminal Entrance at 1233 Alaskan Way). The route leg 1 of the travel plan 400f is planned such that the scheduled transportation vehicle unit 20* called for by route leg 1 will rendezvous with the one or more end users 12 at the appropriate time and to transport the one or more end users 12 on-time so that they will be on-time to be able to catch the 5:00 PM ferry to Bainbridge Island, which is the second route leg (e.g., "route leg 2") of the travel plan 400f.

FIG. 4G illustrates yet another exemplary travel plan 400g, at least a portion of which may be presented or provided by the end user device 10* of FIG. 2A or 2B. In this example, the travel plan 400g calls for two different transportation vehicle units 20* to transport one or more end users 12 over two different route legs (e.g., route leg 1 and route leg 2). Note that included in the travel plan 400g is certain information related to the transportation vehicle units scheduled to rendezvous with the one or more end users 12 including vehicle model, make, driver information, and license number. Also indicated by the travel plan 400g are schedule pickup times and expected or estimated arrival times at the route leg end point (or estimated arrival time at destination location).

Figure 5:
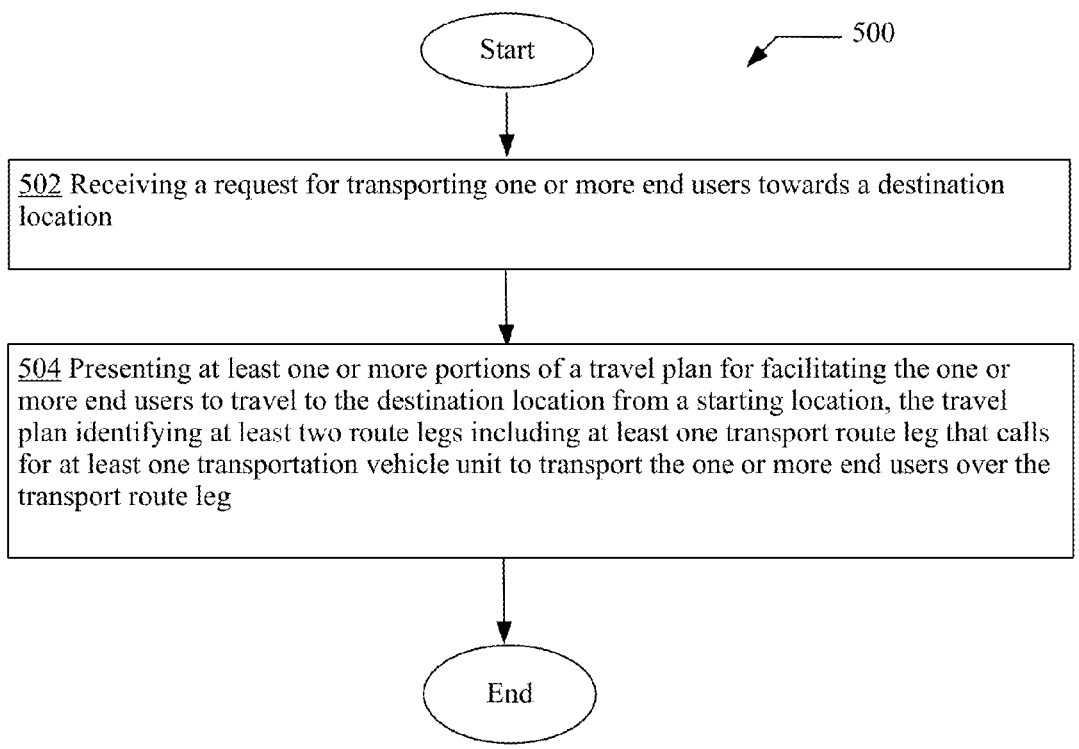
FIG. 5 is a high-level logic flowchart of a process, e.g., operational flow 500, according to some embodiments.

In the following, various operations associated with the above described end user device 10* (e.g., the end user device 10' of FIG. 2A or the end user device 10" of FIG. 2B) will be presented in accordance with various alternative embodiments. FIG. 5, for example, illustrates an operational flow 500 representing example computationally-implemented operations that may be implemented for, among other things providing at least one or more portions of a travel plan for facilitating one or more end users to travel to a destination location from a starting location, the travel plan identifying at least two route legs including at least one transport route leg that calls for at least one transportation vehicle unit to transport the one or more end users over the transport route leg.

In FIG. 5 and in the following figures that include various examples of operational flows, discussions and explanations will be provided with respect to the end user device 10* described above and as illustrated in FIGS. 2A, 2B, 3A, 3B, and 3C, and/or with respect to other examples (e.g., as provided in FIGS. 1, 4A, 4B, 4C, 4D, 4E, 4F, and 4G) and contexts. However, it should be understood that the operational flows may be executed in a number of other environments and contexts, and/or in modified versions of FIGS. 1, 2A, 2B, 3A, 3B, 3C, 4A, 4B, 4C, 4D, 4E, 4F, and/or 4G. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a request receiving operation 502 for receiving a request for transporting one or more end users towards a destination location. For instance, and as illustration, the transport request receiving module 202* of the end user device 10* of FIG. 2A or 2B (e.g., the transport request receiving module 202' of FIG. 2A or the transport request receiving module 202" of FIG. 2B) receiving a request for transporting one or more end users 12 towards a destination location. In various embodiments, the request that may be received may be a request that is inputted by at least one of the one or more end users 12. In some cases, the request may specifically request for a travel plan for traveling to the destination location. In other cases, however, the request that may be received may be a request that specifically requests for transportation for at least a portion of the overall trip to the destination location (e.g., a request for transportation from a ferry or bus terminal to the destination location).

Operational flow 500 may also include a travel plan presenting operation 504 for presenting at least one or more portions of a travel plan for facilitating the one or more end users to travel to the destination location from a starting location, the travel plan identifying at least two route legs including at least one transport route leg that calls for at least one transportation vehicle unit to transport the one or more end users over the transport route leg. For instance, the travel plan providing module 204* (e.g., the travel plan providing module 204' of FIG. 2A or the travel plan providing module 204" of FIG. 2B) of the end user device 10* of FIG. 2A or 2B presenting or providing at least one or more portions (e.g., one or more route legs such as route leg 1 of FIG. 4A or 4B) of a travel plan 400* (e.g., travel plan 400a of FIG. 4A or travel plan 400b of FIG. 4B) for facilitating the one or more end users 12 to travel to the destination location from a starting location, the travel plan 400* identifying at least two route legs including at least one transport route leg (e.g., route leg 3 of FIG. 4A or 4B, or route leg 1 of FIG. 4F) that calls for at least one transportation vehicle unit 20* to transport the one or more end users 12 over the transport route leg (e.g., route leg 3 of FIG. 4A or 4B, or route leg 1 of FIG. 4F). For these implementations, the one or more portions of the travel plan 400* that may be presented may be developed, or alternatively, may have been obtained from an external source such as a network system 14 (e.g., a server or servers, or a plurality of network devices—e.g., "the cloud"). In various implementations, the presenting or providing of the one or more portions of the travel plan 400* may be in response to receiving the request.

Figure 6A:
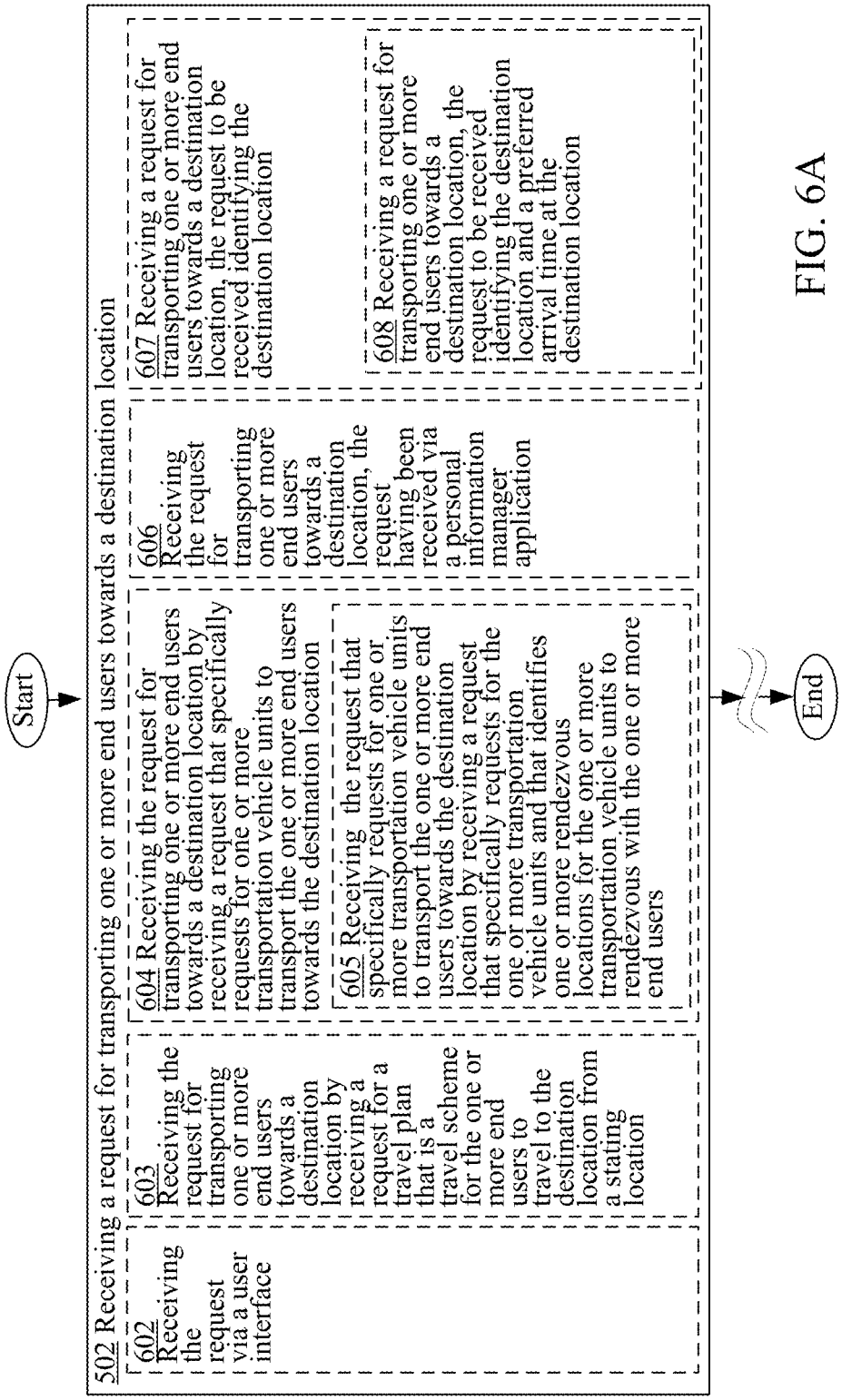
FIG. 6A is a high-level logic flowchart of a process depicting alternate implementations of the request receiving operation 502 of FIG. 5.
Figure 6B:
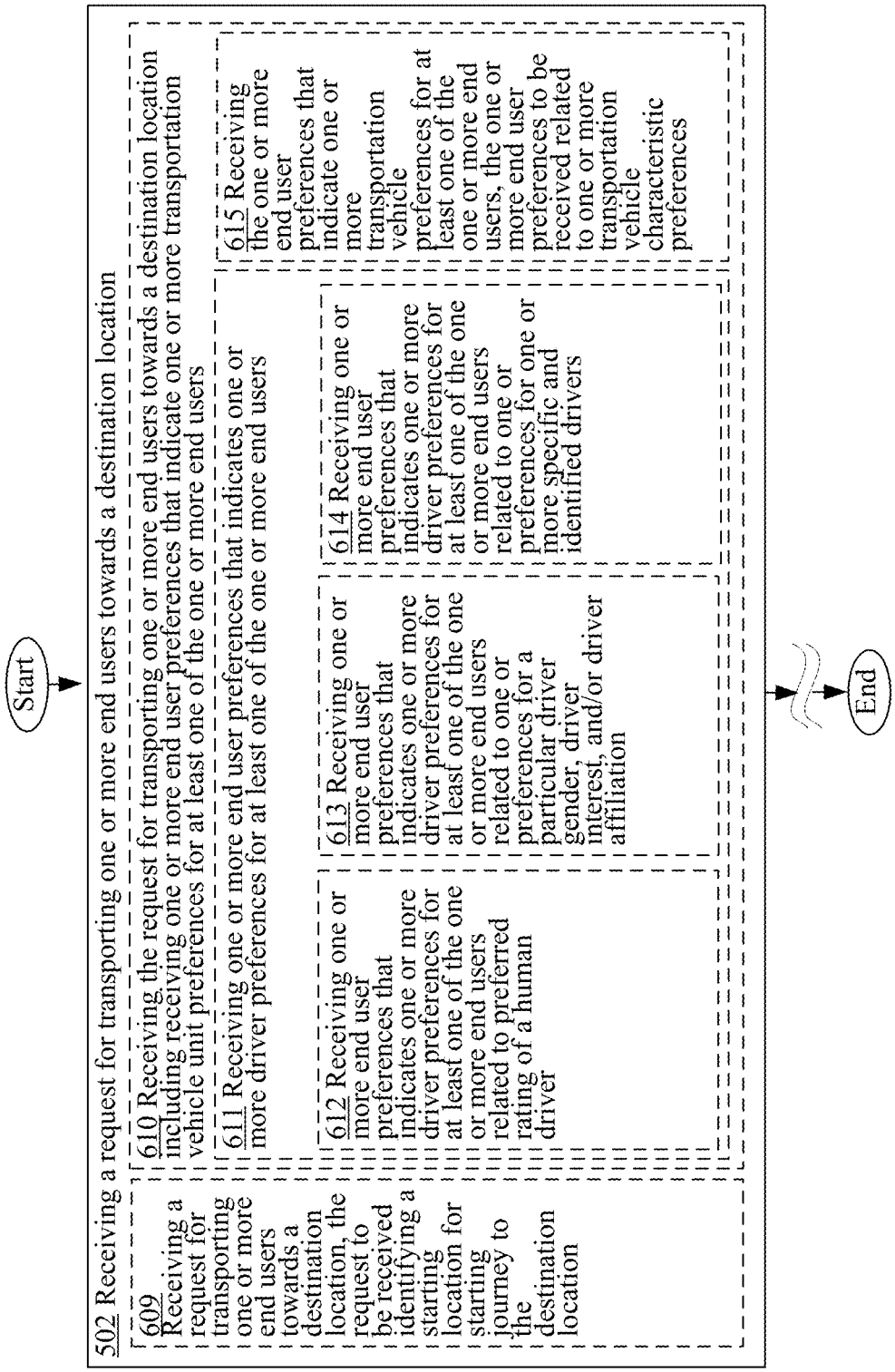
FIG. 6B is a high-level logic flowchart of a process depicting alternate implementations of the request receiving operation 502 of FIG. 5.
Figure 6C:
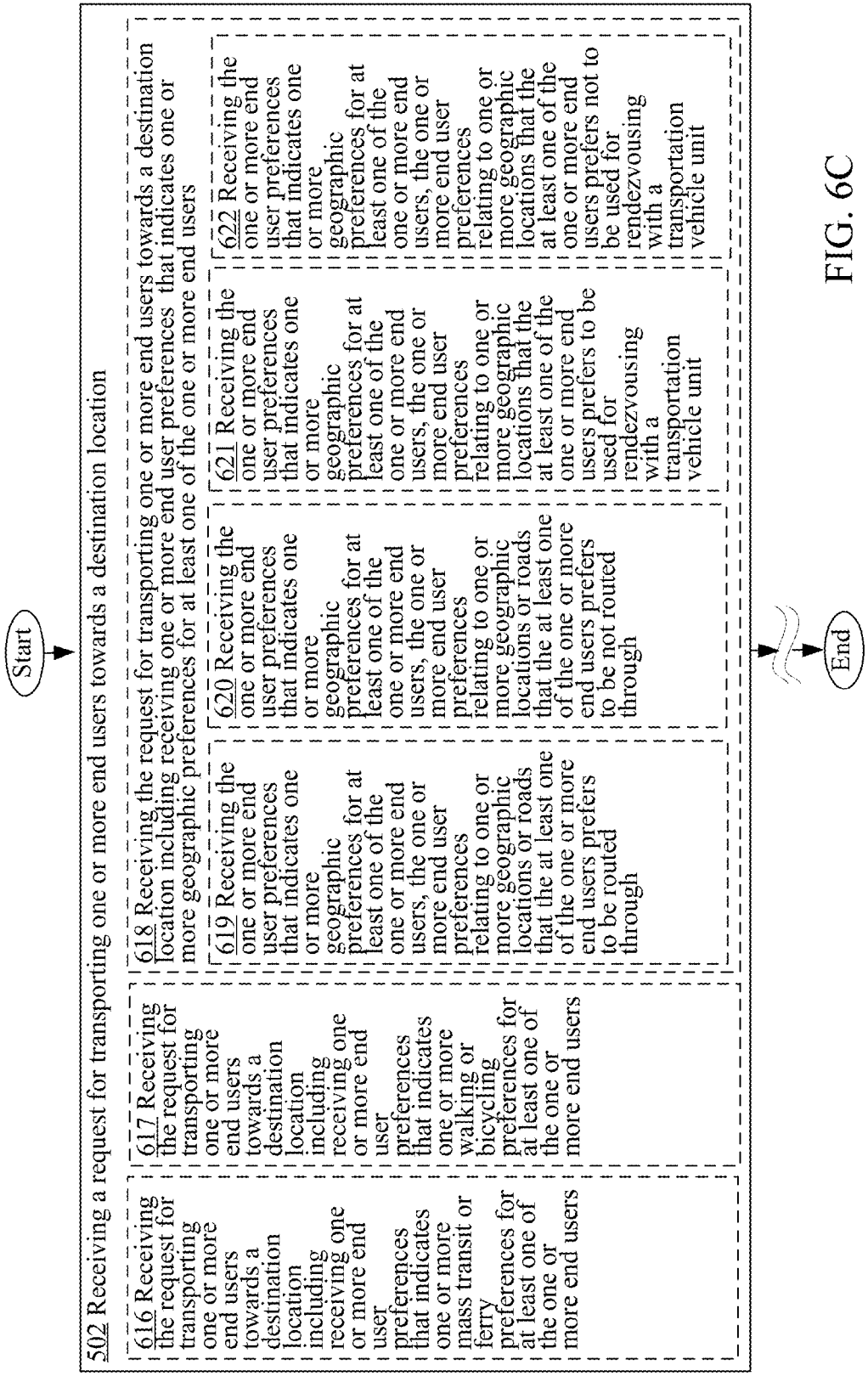
FIG. 6C is a high-level logic flowchart of a process depicting alternate implementations of the request receiving operation 502 of FIG. 5.

As will be described below, the request receiving operation 502 and the travel plan presenting operation 504 may be executed in a variety of different ways in various alternative implementations. FIGS. 6A, 6B, and 6C, for example, illustrate at least some of the alternative ways that the request receiving operation 502 of FIG. 5 may be executed in various alternative implementations. In some cases, for example, the request receiving operation 502 may include an operation 602 for receiving the request via a user interface as illustrated in FIG. 6A. For instance, the transport request receiving module 202* of the end user device 10* (e.g., the end user device 10' of FIG. 2A or the end user device 10" of FIG. 2B) receiving the request via a user interface 250 (e.g., a touchscreen, a microphone, keypad, and so forth—alternatively the request may be received through a wearable device 11 such as an AR device or a Smartwatch).

In various embodiments, the request that may be received through the request receiving operation may be a specific request for the travel plan 400* or specifically for transport services for being transported over a portion of an overall travel plan to the destination location. For example, in various implementations, the request receiving operation 502 may include an operation 603 for receiving the request for transporting one or more end users towards a destination location by receiving a request for a travel plan that is a travel scheme for the one or more end users to travel to the destination location from a stating location. For instance, the transport request receiving module 202* of the end user device 10* of FIG. 2A or 2B receiving the request for transporting one or more end users 12 towards a destination location by receiving a request that is a specific request for a travel plan 400* that is a travel scheme for the one or more end users 12 to travel to the destination location from a stating location. For example, one of the one or more end users 12 requesting that a travel plan 400* be presented for traveling from a starting location to the destination location.

In the same or alternative implementations, the request receiving operation 502 may alternatively or additionally include or involve an operation 604 for receiving the request for transporting one or more end users towards a destination location by receiving a request that specifically requests for one or more transportation vehicle units to transport the one or more end users towards the destination location. For instance, the transport request receiving module 202* of the end user device 10* of FIG. 2A or 2B receiving the request for transporting one or more end users 12 towards a destination location by receiving a request that specifically requests for one or more transportation vehicle units 20* to transport the one or more end users 12 towards the destination location. For example, at least one of the one or more end users 12 may request that a transportation vehicle unit 20* rendezvous with the one or more end users 12 at a ferry or bus terminal in order to be transported over at least a portion of a travel plan for traveling from a starting location to the destination location.

In some cases, operation 604 may further include or involve an operation 605 for receiving the request that specifically requests for one or more transportation vehicle units to transport the one or more end users towards the destination location by receiving a request that specifically requests for the one or more transportation vehicle units and that identifies one or more rendezvous locations for the one or more transportation vehicle units to rendezvous with the one or more end users. For instance, the transport request receiving module 202* of the end user device 10* of FIG. 2A or 2B receiving the request that specifically requests for one or more transportation vehicle units 20* to transport the one or more end users 12 towards the destination location by receiving a request that specifically requests for the one or more transportation vehicle units 20* and that identifies one or more rendezvous locations (e.g., a ferry or bus terminal, train stop, bike or walking trail entrance, and so forth) for the one or more transportation vehicle units 20* to rendezvous with the one or more end users 12.

In the same or alternative implementations, the request receiving operation 502 may alternatively or additionally include or involve an operation 606 for receiving the request for transporting one or more end users towards a destination location, the request having been received via a personal information manager application. For instance, the transport request receiving module 202* of the end user device 10* of FIG. 2A or 2B receiving the request for transporting one or more end users 12 towards a destination location, the request having been received via a personal information manager application (e.g., Microsoft Outlook).

The request that may be received through the request receiving operation 502 may include a variety of information in various alternative implementations, For example, in some implementations, the request receiving operation 502 may include or involve an operation 607 for receiving a request for transporting one or more end users towards a destination location, the request to be received identifying the destination location. For instance, the transport request receiving module 202* of the end user device 10* of FIG. 2A or 2B receiving a request for transporting one or more end users 12 towards a destination location, the request to be received identifying the destination location.

In some cases, operation 607 may further involve an operation 608 for receiving a request for transporting one or more end users towards a destination location, the request to be received identifying the destination location and a preferred arrival time at the destination location. For instance, the transport request receiving module 202* of the end user device 10* of FIG. 2A or 2B receiving a request for transporting one or more end users 12 towards a destination location, the request to be received identifying the destination location and a preferred arrival time at the destination location (e.g., the latest time by which at least one of the one or more end users 12 wishes to arrive at the destination location).

Referring now to FIG. 6B, in various implementations, the request receiving operation 502 may include an operation 609 for receiving a request for transporting one or more end users towards a destination location, the request to be received identifying a starting location for starting journey to the destination location. For instance, the transport request receiving module 202* of the end user device 10* of FIG. 2A or 2B receiving a request for transporting one or more end users 12 towards a destination location, the request to be received identifying a starting location for starting journey to the destination location.

In various implementations, the request receiving operation 502 may include an operation 610 for receiving the request for transporting one or more end users towards a destination location including receiving one or more end user preferences that indicate one or more transportation vehicle unit preferences for at least one of the one or more end users. For instance, the transport request receiving module 202* including the end user preference receiving module 302 (see FIG. 3A) of the end user device 10* of FIG. 2A or 2B receiving the request for transporting one or more end users 12 towards a destination location including receiving, by the end user preference receiving module 302, one or more end user preferences that indicate one or more transportation vehicle unit preferences for at least one of the one or more end users 12. In some implementations, the data indicative of the one or more end users preferences may be received with the request, while in other implementations, the data may be received prior to or subsequent to receiving the request. In various implementations, the one or more end user preferences may be entered by the at least one of the one or more end users 12 via a user interface 250 (e.g., touchscreen, keypad, microphone, and so forth).

In some implementations, operation 610 may, in turn, further include an operation 611 for receiving one or more end user preferences that indicates one or more driver preferences for at least one of the one or more end users. For instance, the end user preference receiving module 302 of the end user device 10* of FIG. 2A or 2B receiving one or more end user preferences that indicates one or more driver preferences (e.g., end user preferences that a human driver have certain characteristics) for at least one of the one or more end users 12.

In some implementations, an operation 612 for receiving one or more end user preferences that indicates one or more driver preferences for at least one of the one or more end users related to preferred rating of a human driver. For instance, the end user preference receiving module 302 of the end user device 10* of FIG. 2A or 2B receiving one or more end user preferences that indicates one or more driver preferences for at least one of the one or more end users 12 related to preferred rating of a human driver (e.g., end user preference that a human driver have an average rating from other end users of a certain amount).

In the same or different implementations, operation 611 may additionally or alternatively include an operation 613 for receiving one or more end user preferences that indicates one or more driver preferences for at least one of the one or more end users related to one or more preferences for a particular driver gender, driver interest, and/or driver affiliation. For instance, the end user preference receiving module 302 of the end user device 10* of FIG. 2A or 2B receiving one or more end user preferences that indicates one or more driver preferences for at least one of the one or more end users 12 related to one or more preferences for a particular driver gender (e.g., female), driver interest (e.g., Jets football team), and/or driver affiliation (e.g., American Association of Retired Persons or AARP).

In the same or different implementations, operation 611 may additionally or alternatively include an operation 614 for receiving one or more end user preferences that indicates one or more driver preferences for at least one of the one or more end users related to one or more preferences for one or more specific and identified drivers. For instance, the end user preference receiving module 302 of the end user device 10* of FIG. 2A or 2B receiving one or more end user preferences that indicates one or more driver preferences for at least one of the one or more end users 12 related to one or more preferences for one or more specific and identified drivers. For example, receiving end user preference data that indicates a preference that the driver for a selected transportation vehicle unit 20* (selected for transporting one or more end users 12) be a driver from a list of pre-approved drivers as previously approved by the at least one of the one or more end users 12.

In various implementations, operation 610 may include an operation 615 for receiving the one or more end user preferences that indicate one or more transportation vehicle preferences for at least one of the one or more end users, the one or more end user preferences to be received related to one or more transportation vehicle characteristic preferences. For instance, the end user preference receiving module 302 of the end user device 10* of FIG. 2A or 2B receiving the one or more end user preferences that indicate one or more transportation vehicle preferences for at least one of the one or more end users 12, the one or more end user preferences to be received related to one or more transportation vehicle characteristic preferences (e.g., ample leg room, particular models, etc.).

Turning to FIG. 6C, in the same or alternative implementations, the request receiving operation 502 may additionally or alternatively include an operation 616 for receiving the request for transporting one or more end users towards a destination location including receiving one or more end user preferences that indicates one or more mass transit or ferry preferences for at least one of the one or more end users. For instance, the transport request receiving module 202* including the end user preference receiving module 302 of the end user device 10* of FIG. 2A or 2B receiving the request for transporting one or more end users 12 towards a destination location including receiving one or more end user preferences that indicates one or more mass transit or ferry preferences (e.g., preference not to use or prefer only certain ferries leaving from certain ports or at certain times) for at least one of the one or more end users 12.

In the same or alternative implementations, the request receiving operation 502 may additionally or alternatively include an operation 617 for receiving the request for transporting one or more end users towards a destination location including receiving one or more end user preferences that indicates one or more walking or bicycling preferences for at least one of the one or more end users. For instance, the transport request receiving module 202* including the end user preference receiving module 302 of the end user device 10* of FIG. 2A or 2B receiving the request for transporting one or more end users 12 towards a destination location including receiving, by the end user preference receiving module 302, one or more end user preferences that indicates one or more walking or bicycling preferences for at least one of the one or more end users 12.

In the same or alternative implementations, the request receiving operation 502 may additionally or alternatively include an operation 618 for receiving the request for transporting one or more end users towards a destination location including receiving one or more end user preferences that indicates one or more geographic preferences for at least one of the one or more end users. For instance, the transport request receiving module 202* including the end user preference receiving module 302 of the end user device 10* of FIG. 2A or 2B receiving the request for transporting one or more end users 12 towards a destination location including receiving, by the end user preference receiving module 302, one or more end user preferences that indicates one or more geographic preferences for at least one of the one or more end users 12.

As further illustrated in FIG. 6C, in various implementations, operation 618 may further include one or more additional operations including, in some cases, an operation 619 for receiving the one or more end user preferences that indicates one or more geographic preferences for at least one of the one or more end users, the one or more end user preferences relating to one or more geographic locations or roads that the at least one of the one or more end users prefers to be routed through. For instance, the end user preference receiving module 302 of the end user device 10* of FIG. 2A or 2B receiving the one or more end user preferences that indicates one or more geographic preferences for at least one of the one or more end users 12, the one or more end user preferences relating to one or more geographic locations or roads that the at least one of the one or more end users 12 prefers to be routed through. For example, in some cases, an end user 12 may prefer to be routed through certain geographic locations or roads to avoid traffic or for safety reasons.

In the same or alternative implementations, operation 618 may additionally or alternatively include an operation 620 for receiving the one or more end user preferences that indicates one or more geographic preferences for at least one of the one or more end users, the one or more end user preferences relating to one or more geographic locations or roads that the at least one of the one or more end users prefers to be not routed through. For instance, the end user preference receiving module 302 of the end user device 10* of FIG. 2A or 2B receiving the one or more end user preferences that indicates one or more geographic preferences for at least one of the one or more end users 12, the one or more end user preferences relating to one or more geographic locations or roads that the at least one of the one or more end users 12 prefers to be not routed through. For example, an end user 12 may prefer a certain location or roads for traveling because of traffic or safety reasons.

In the same or alternative implementations, operation 618 may additionally or alternatively include an operation 621 for receiving the one or more end user preferences that indicates one or more geographic preferences for at least one of the one or more end users, the one or more end user preferences relating to one or more geographic locations that the at least one of the one or more end users prefers to be used for rendezvousing with a transportation vehicle unit. For instance, the end user preference receiving module 302 of the end user device 10* of FIG. 2A or 2B receiving the one or more end user preferences that indicates one or more geographic preferences for at least one of the one or more end users 12, the one or more end user preferences relating to one or more geographic locations that the at least one of the one or more end users 12 prefers to be used for rendezvousing with a transportation vehicle unit. That is, in some cases, an end user 12 may prefer, for various reasons (e.g., safety, handicap friendly), certain locations for rendezvousing with transportation vehicle unit 20*.

In the same or alternative implementations, operation 618 may additionally or alternatively include an operation 622 for receiving the one or more end user preferences that indicates one or more geographic preferences for at least one of the one or more end users, the one or more end user preferences relating to one or more geographic locations that the at least one of the one or more end users prefers not to be used for rendezvousing with a transportation vehicle unit. For instance, the end user preference receiving module 302 of the end user device 10* of FIG. 2A or 2B receiving the one or more end user preferences that indicates one or more geographic preferences for at least one of the one or more end users 12, the one or more end user preferences relating to one or more geographic locations that the at least one of the one or more end users 12 prefers not to be used for rendezvousing with a transportation vehicle unit.

Referring back to the travel plan presenting operation 504 of FIG. 5, the travel plan presenting operation 504 similar to the request receiving operation 502 of FIG. 5 may be executed in a number of different ways in various alternative embodiments as illustrated, for example, in FIGS. 7A, 7B, 7C, 7D, 7E, 7F, 7G, 7H, and 7I. In some cases, for example, the travel plan presenting operation 504 may actually include an operation 722 for presenting or providing the at least one or more portions of the travel plan 400* in response, at least in part, to reception of the request, which may be received from an end user 12 via, for example, a user interface 250 or via wearable device 11

Figure 7A:
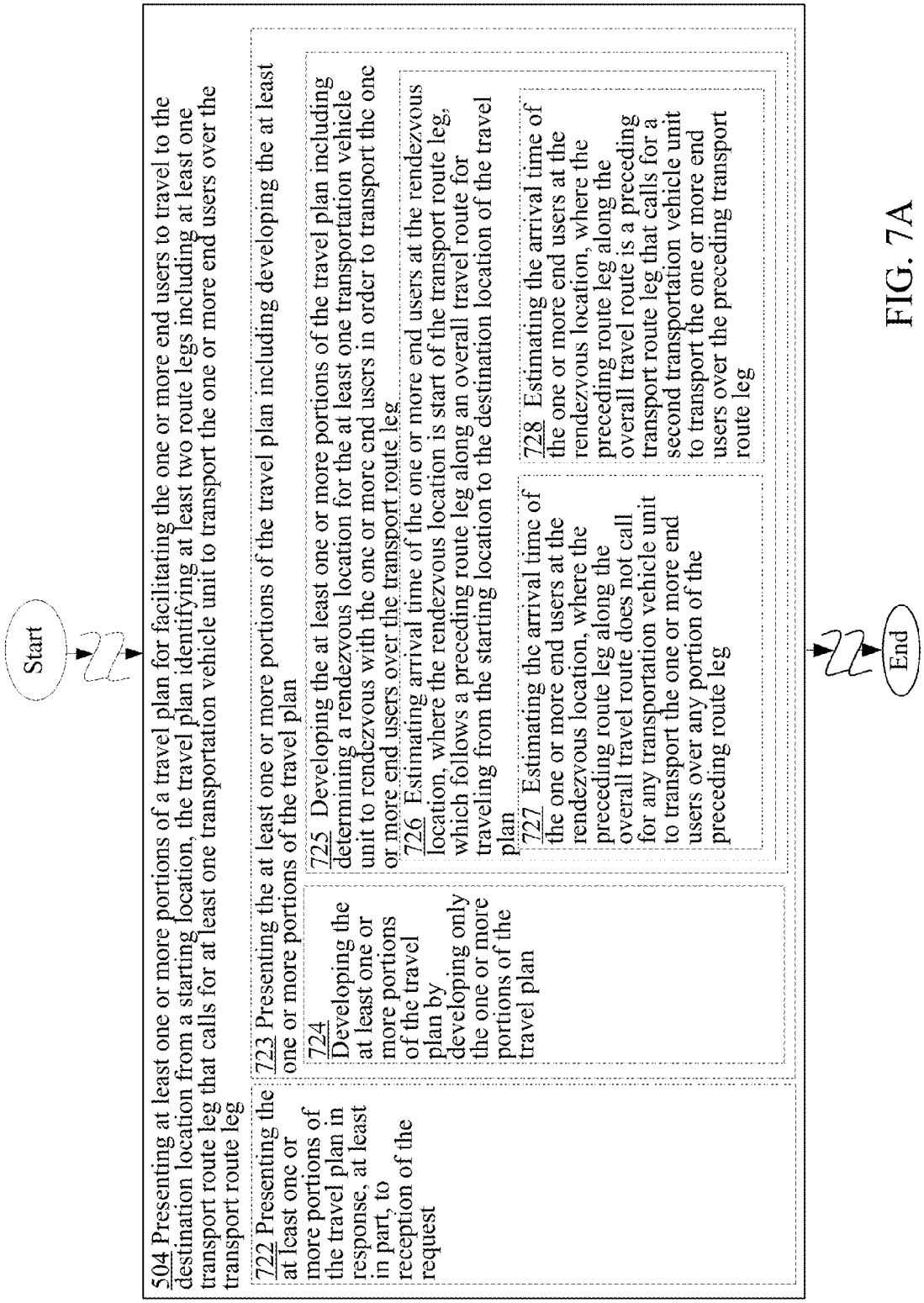
FIG. 7A is a high-level logic flowchart of a process depicting alternate implementations of the travel plan presenting operation 504 of FIG. 5.
Figure 7B:
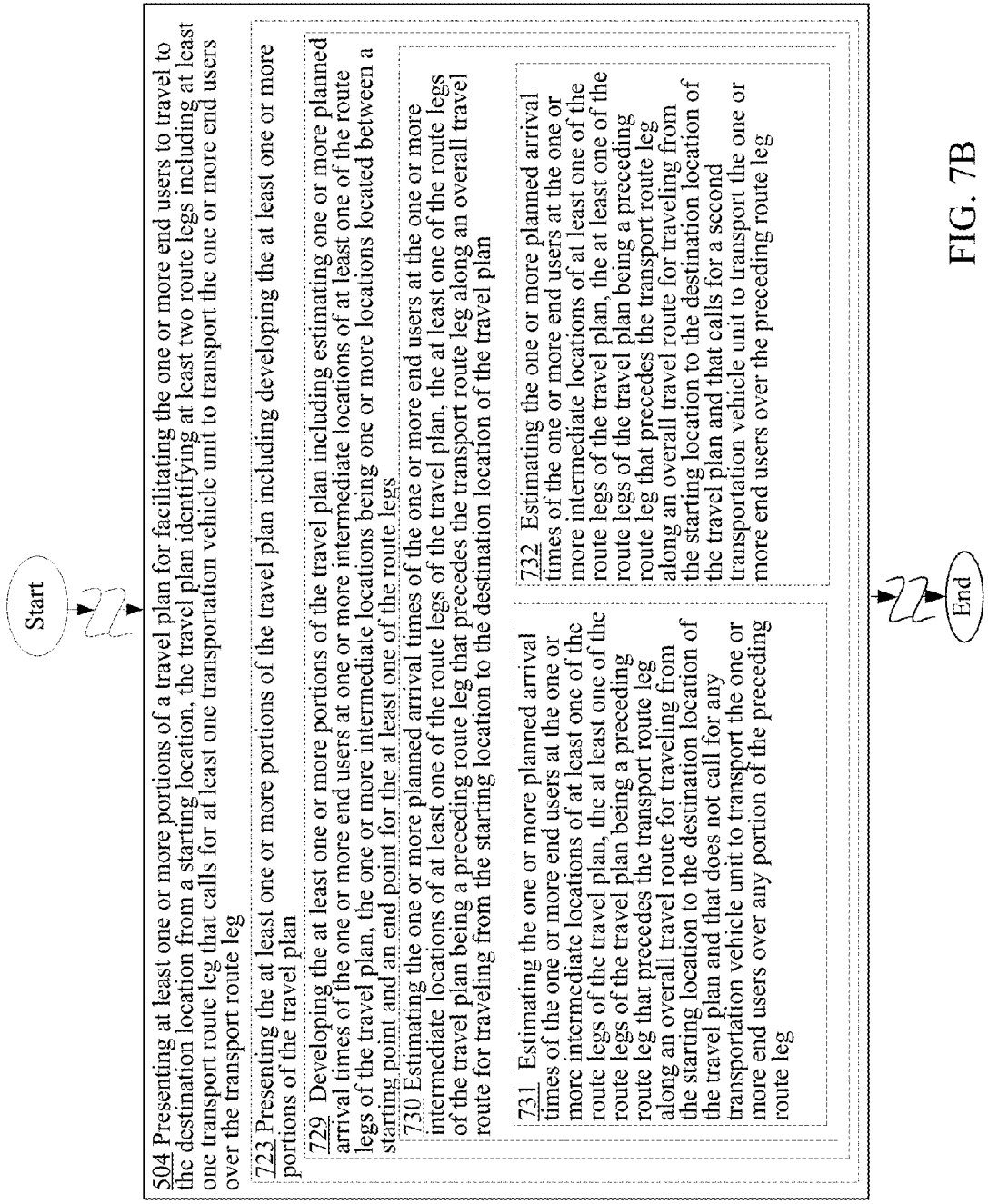
FIG. 7B is a high-level logic flowchart of a process depicting alternate implementations of the travel plan presenting operation 504 of FIG. 5.

In the same or alternative implementations, the travel plan presentation operation 504 may additionally or alternatively include an operation 723 for presenting the at least one or more portions of the travel plan including developing the at least one or more portions of the travel plan as illustrated in, for example, FIGS. 7A and 7B. For instance, the travel plan providing module 204* including the travel plan creating module 304 (see, for example, FIG. 3B) of the end user device 10* of FIG. 2A or 2B presenting the at least one or more portions of the travel plan 400* including developing or creating, by the travel plan creating module 304, the at least one or more portions of the travel plan 400*.

As further illustrated in FIGS. 7A and 7B, in various implementations operation 723 may include one or more additionally operations including, in some cases, an operation 724 for developing the at least one or more portions of the travel plan by developing only the one or more portions of the travel plan. For instance, the travel plan creating module 304 of the end user device 10* of FIG. 2A or 2B developing the at least one or more portions of the travel plan 400* by developing or creating only the one or more portions of the travel plan 400* while not creating the other portion or portions of the travel plan 400*. For example, creating a first route leg that calls for the one or more end users 12 to walk the first route leg and only to determine the rendezvous location and/or rendezvous for the one or more end users 12 to rendezvous with one or more transportation vehicle units 20* in order to be transported over a second route leg, which may not be actually created.

In the same or alternative implementations, operation 723 may additionally or alternatively include an operation 725 for developing the at least one or more portions of the travel plan including determining a rendezvous location for the at least one transportation vehicle unit to rendezvous with the one or more end users in order to transport the one or more end users over the transport route leg. For instance, the travel plan creating module 304 including the rendezvous location ascertaining module 306 (see, for example, FIG. 3B) of the end user device 10* of FIG. 2A or 2B developing the at least one or more portions of the travel plan 400* including determining or ascertaining, by the rendezvous location ascertaining module 306, a rendezvous location for the at least one transportation vehicle unit 20* to rendezvous with the one or more end users 12 in order to transport the one or more end users 12 over the transport route leg.

In some implementations, operation 725 may actually involve an operation 726 for estimating arrival time of the one or more end users at the rendezvous location, where the rendezvous location is start of the transport route leg, which follows a preceding route leg along an overall travel route for traveling from the starting location to the destination location of the travel plan. For instance, the rendezvous arrival time estimating module 308 (see, for example, FIG. 3B) of the end user device 10\* of FIG. 2A or 2B estimating a projected arrival time of the one or more end users 12 at the rendezvous location, where the rendezvous location is start of the transport route leg, which is a transport route leg that follows a preceding route leg along an overall travel route for traveling from the starting location to the destination location of the travel plan 400\*. For example, in the travel plan 400\* (e.g., travel plan 400*a* or 400*b*) of FIG. 4A or 4B, route leg 3 (which is a transport route leg) follows route leg 2.

In various implementations, operation 726 may actually include an operation 727 for estimating the arrival time of the one or more end users at the rendezvous location, where the preceding route leg along the overall travel route does not call for any transportation vehicle unit to transport the one or more end users over any portion of the preceding route leg. For instance, the rendezvous arrival time estimating module 308 of the end user device 10\* of FIG. 2A or 2B estimating the arrival time of the one or more end users 12 at the rendezvous location, where the preceding route leg (e.g., route leg 2 of FIG. 4A or 4B) along the overall travel route does not call for any transportation vehicle unit 208 to transport the one or more end users 12 over any portion of the preceding route leg. For example, the preceding route leg may call for the one or more end users 12 to walk and/or to catch a bus or ferry as illustrated, for example, by route leg 2 of FIG. 4A or 4B.

In some alternative implementations, operation 726 may alternatively include an operation 728 for estimating the arrival time of the one or more end users at the rendezvous location, where the preceding route leg along the overall travel route is a preceding transport route leg that calls for a second transportation vehicle unit to transport the one or more end users over the preceding transport route leg. For instance, the rendezvous arrival time estimating module 308 of the end user device 10\* of FIG. 2A or 2B estimating the arrival time of the one or more end users 12 at the rendezvous location, where the preceding route leg (e.g., route leg 1 of travel plan 400*g* of FIG. 4G) along the overall travel route is a preceding transport route leg that calls for a second transportation vehicle unit 20\* to transport the one or more end users 12 over the preceding transport route leg (e.g., route leg 1 of travel plan 400*g* of FIG. 4G).

In the same or alternative implementations, the operation 723 for presenting the at least one or more portions of the travel plan including developing the at least one or more portions of the travel plan may additionally or alternatively include an operation 729 for developing the at least one or more portions of the travel plan including estimating one or more planned arrival times of the one or more end users at one or more intermediate locations of at least one of the route legs of the travel plan, the one or more intermediate locations being one or more locations located between a starting point and an end point for the at least one of the route legs as illustrated in FIG. 7B. For instance, the travel plan creating module 304 including the intermediate location arrival time estimating module 310 (see, for example, FIG. 3B) of the end user device 10\* of FIG. 2A or 2B developing the at least one or more portions of the travel plan 400\* including estimating, by the intermediate location arrival time estimating module 310, one or more planned or projected arrival times (e.g., planned intermediate arrival times 422\* of FIG. 4C or 4D) of the one or more end users 12 at one or more intermediate locations (e.g., intermediate locations 421\* of FIG. 4C or 4D) of at least one of the route legs of the travel plan (e.g., travel plan 400*a* or 400*b* of FIG. 4A or 4B), the one or more intermediate locations being one or more locations located between a starting point and an end point for the at least one of the route legs (e.g., route legs 1 or 2 of FIG. 4A or 4B).

As further illustrated in FIG. 7B, in some cases, operation 729 may further include an operation 730 for estimating the one or more planned arrival times of the one or more end users at the one or more intermediate locations of at least one of the route legs of the travel plan, the at least one of the route legs of the travel plan being a preceding route leg that precedes the transport route leg along an overall travel route for traveling from the starting location to the destination location of the travel plan. For instance, the intermediate location arrival time estimating module 310 of the end user device 10\* of FIG. 2A or 2B estimating the one or more planned arrival times of the one or more end users 12 at the one or more intermediate locations of at least one of the route legs of the travel plan 400\*, the at least one of the route legs of the travel plan 400\* being a preceding route leg (e.g., route leg 2 of FIG. 4A or 4B) that precedes the transport route leg (e.g., route leg 3 of FIG. 4A or 4B) along an overall travel route for traveling from the starting location to the destination location of the travel plan 400\*.

As further illustrated in FIG. 7B, in some implementations, operation 730 may further include an operation 731 for estimating the one or more planned arrival times of the one or more end users at the one or more intermediate locations of at least one of the route legs of the travel plan, the at least one of the route legs of the travel plan being a preceding route leg that precedes the transport route leg along an overall travel route for traveling from the starting location to the destination location of the travel plan and that does not call for any transportation vehicle unit to transport the one or more end users over any portion of the preceding route leg. For instance, the intermediate location arrival time estimating module 310 of the end user device 10\* of FIG. 2A or 2B estimating the one or more planned arrival times of the one or more end users 12 at the one or more intermediate locations (e.g., intermediate locations 421*d* of FIG. 4D) of at least one of the route legs of the travel plan (e.g., travel plan 400*a* or 400*b* of FIG. 4A or 4D), the at least one of the route legs of the travel plan 400\* being a preceding route leg that precedes the transport route leg (e.g., route leg 3 of FIG. 4A or 4B) along an overall travel route for traveling from the starting location to the destination location of the travel plan 400\* and that does not call for any transportation vehicle unit 20\* to transport the one or more end users 12 over any portion of the preceding route leg (e.g., route leg 2 of FIG. 4A or 4B).

In some implementations, operation 730 may include an operation 732 for estimating the one or more planned arrival times of the one or more end users at the one or more intermediate locations of at least one of the route legs of the travel plan, the at least one of the route legs of the travel plan being a preceding route leg that precedes the transport route leg along an overall travel route for traveling from the starting location to the destination location of the travel plan and that calls for a second transportation vehicle unit to transport the one or more end users over the preceding route leg. For instance, the intermediate location arrival time estimating module 310 of the end user device 10\* of FIG. 2A or 2B estimating the one or more planned arrival times of the one or more end users 12 at the one or more intermediate locations of at least one of the route legs of the travel plan 400g (see FIG. 4G), the at least one of the route legs of the travel plan being a preceding route leg (e.g., route leg 1 of FIG. 4G) that precedes the transport route leg (e.g., route leg 2 of FIG. 4G) along an overall travel route for traveling from the starting location to the destination location of the travel plan 400g and that calls for a second transportation vehicle unit 20* to transport the one or more end users 12 over the preceding route leg (e.g., route leg 1 of FIG. 4G).

Figure 7C:
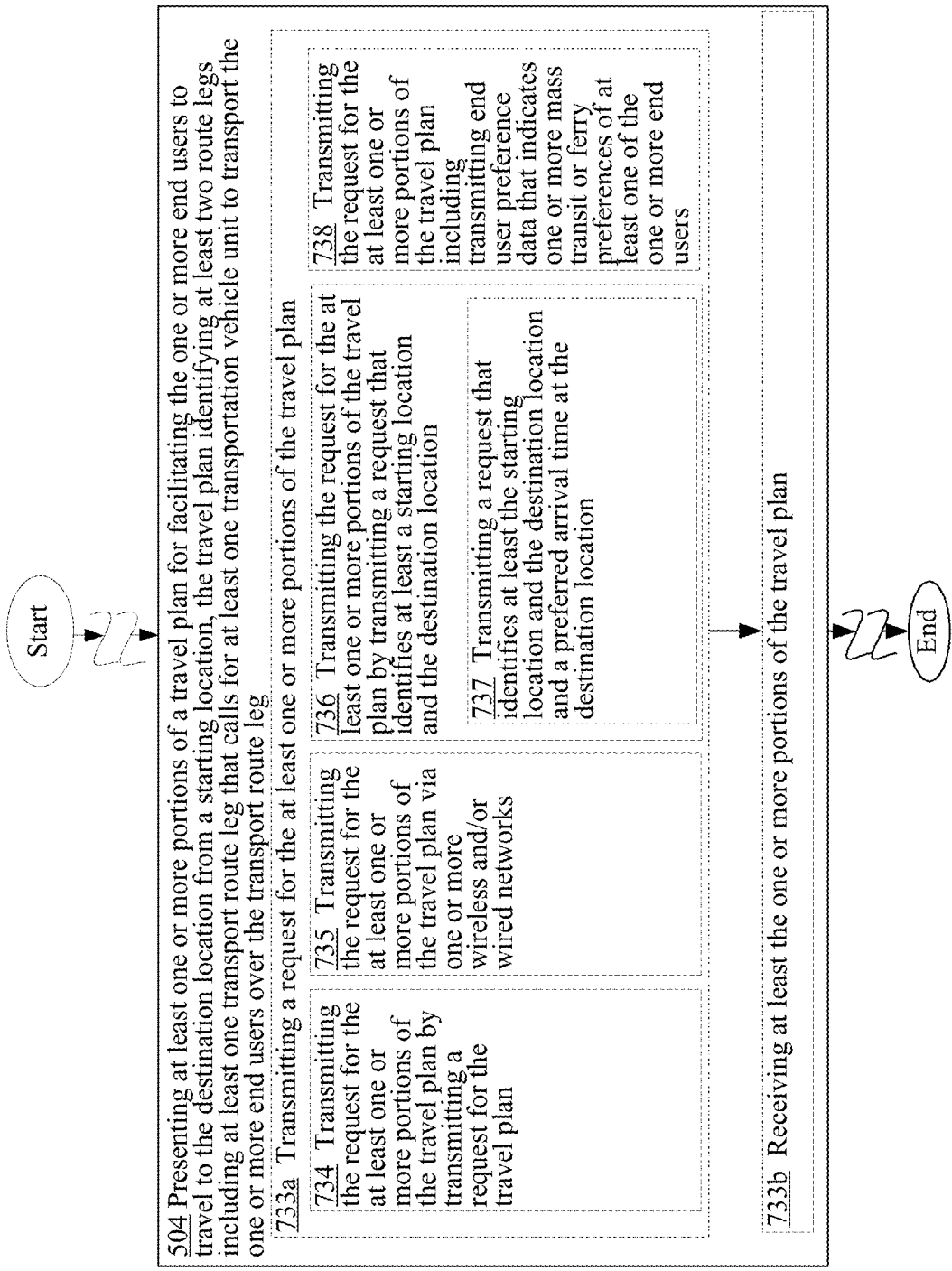
FIG. 7C is a high-level logic flowchart of a process depicting alternate implementations of the travel plan presenting operation 504 of FIG. 5.
Figure 7D:
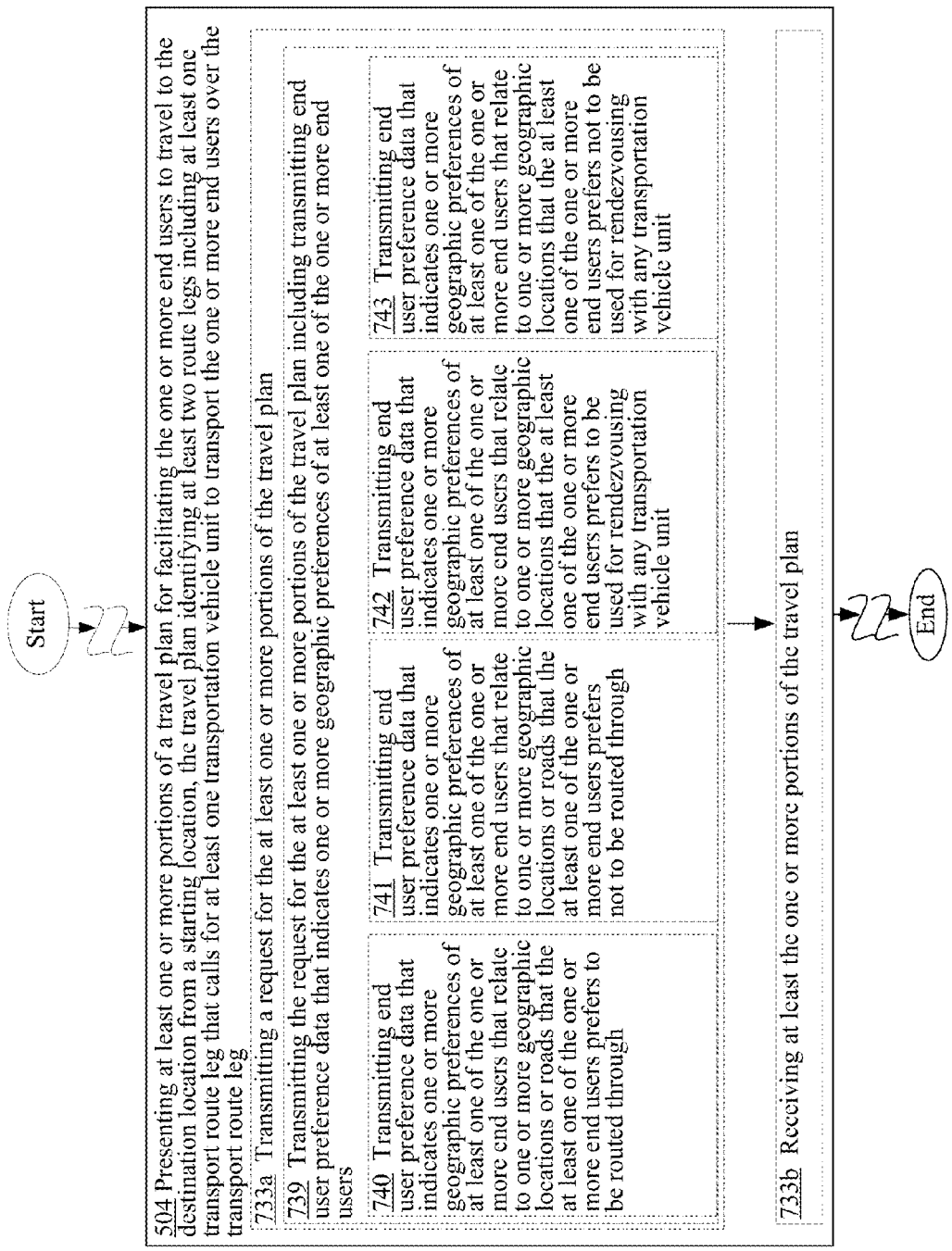
FIG. 7D is a high-level logic flowchart of a process depicting alternate implementations of the travel plan presenting operation 504 of FIG. 5.

In various implementations, the travel plan presenting operation 504 of FIG. 5 may actually involve obtaining the one or more portions of the travel plan form an external source. For these implementations, the travel plan presenting operation 504 may include, for example, an operation 733a for transmitting a request for the at least one or more portions of the travel plan and an operation 733b for receiving at least the one or more portions of the travel plan as illustrated in FIGS. 7C and 7D. For instance, the travel plan request transmitting module 312 (see, for example, FIG. 3B) of the end user device 10* of FIG. 2A or 2B transmitting (via, for example, the network interface 240) a request for the at least one or more portions of the travel plan 400*, and the travel plan receiving module 314 of the end user device 10* receiving (via, for example, the network interface 240) at least the one or more portions of the travel plan 400*.

As further illustrated in FIGS. 7C and 7D, in various implementations, operation 733a may further include one or more additional operations including, in some cases, an operation 734 for transmitting the request for the at least one or more portions of the travel plan by transmitting a request for the travel plan. For instance, the travel plan request transmitting module 312 of the end user device 10* of FIG. 2A or 2B transmitting the request for the at least one or more portions of the travel plan 400* by transmitting a request for the travel plan 400* (e.g., transmitting a request for the entire travel plan 400*).

In the same or alternative implementations, operation 733a may additionally or alternatively include an operation 735 for transmitting the request for the at least one or more portions of the travel plan via one or more wireless and/or wired networks. For instance, the travel plan request transmitting module 312 of the end user device 10* of FIG. 2A or 2B transmitting the request for the at least one or more portions of the travel plan 400* via one or more wireless and/or wired networks 16.

In the same or alternative implementations, operation 733a may additionally or alternatively include an operation 736 for transmitting the request for the at least one or more portions of the travel plan by transmitting a request that identifies at least a starting location and the destination location. For instance, the travel plan request transmitting module 312 of the end user device 10* of FIG. 2A or 2B transmitting the request for the at least one or more portions of the travel plan 400* by transmitting a request that identifies at least a starting location (e.g., may be in the form of GPS data) and the destination location.

In some cases, operation 736 may further include an operation 737 for transmitting a request that identifies at least the starting location and the destination location and a preferred arrival time at the destination location. For instance, the travel plan request transmitting module 312 of the end user device 10* of FIG. 2A or 2B transmitting a request that identifies at least the starting location and the destination location and a preferred arrival time (e.g., latest arrival time as preferred by an end user 12) at the destination location.

In the same or alternative implementations, operation 733a may additionally or alternatively include an operation 738 for transmitting the request for the at least one or more portions of the travel plan including transmitting end user preference data that indicates one or more mass transit or ferry preferences of at least one of the one or more end users. For instance, the travel plan request transmitting module 312 and the end user preference data transmitting module 313 of the end user device 10* of FIG. 2A or 2B transmitting the request for the at least one or more portions of the travel plan 400* including the end user preference data transmitting module 313 transmitting end user preference data that indicates one or more mass transit or ferry preferences of at least one of the one or more end users 12.

In the same or alternative implementations, operation 733a may additionally or alternatively include an operation 739 for transmitting the request for the at least one or more portions of the travel plan including transmitting end user preference data that indicates one or more geographic preferences of at least one of the one or more end users as illustrated in FIG. 7D. For instance, the travel plan request transmitting module 312 and the end user preference data transmitting module 313 of the end user device 10* of FIG. 2A or 2B transmitting the request for the at least one or more portions of the travel plan 400* including the end user preference data transmitting module 313 transmitting end user preference data that indicates one or more geographic preferences of at least one of the one or more end users 12.

As further illustrated, operation 739, in various implementations, may further include one or more additional operations including, in some cases, an operation 740 for transmitting end user preference data that indicates one or more geographic preferences of at least one of the one or more end users that relate to one or more geographic locations or roads that the at least one of the one or more end users prefers to be routed through. For instance, the end user preference data transmitting module 313 of the end user device 10* of FIG. 2A or 2B transmitting end user preference data that indicates one or more geographic preferences of at least one of the one or more end users 12 that relate to one or more geographic locations or roads that the at least one of the one or more end users 12 prefers to be routed through.

In the same or alternative implementations, operation 739 may additionally or alternatively include an operation 741 for transmitting end user preference data that indicates one or more geographic preferences of at least one of the one or more end users that relate to one or more geographic locations or roads that the at least one of the one or more end users prefers not to be routed through. For instance, the end user preference data transmitting module 313 of the end user device 10* of FIG. 2A or 2B transmitting end user preference data that indicates one or more geographic preferences of at least one of the one or more end users 12 that relate to one or more geographic locations or roads that the at least one of the one or more end users 12 prefers not to be routed through.

In the same or alternative implementations, operation 739 may additionally or alternatively include an operation 742 for transmitting end user preference data that indicates one or more geographic preferences of at least one of the one or more end users that relate to one or more geographic locations that the at least one of the one or more end users prefers to be used for rendezvousing with any transportation vehicle unit. For instance, the end user preference data transmitting module 313 of the end user device 10* of FIG. 2A or 2B transmitting end user preference data that indicates one or more geographic preferences of at least one of the one or more end users 12 that relate to one or more geographic locations that the at least one of the one or more end users 12 prefers to be used for rendezvousing with any transportation vehicle unit 20*.

In the same or alternative implementations, operation 739 may additionally or alternatively include an operation 743 for transmitting end user preference data that indicates one or more geographic preferences of at least one of the one or more end users that relate to one or more geographic locations that the at least one of the one or more end users prefers not to be used for rendezvousing with any transportation vehicle unit. For instance, the end user preference data transmitting module 313 of the end user device 10* of FIG. 2A or 2B transmitting end user preference data that indicates one or more geographic preferences of at least one of the one or more end users 12 that relate to one or more geographic locations that the at least one of the one or more end users 12 prefers not to be used for rendezvousing with any transportation vehicle unit 20*.

Figure 7E:
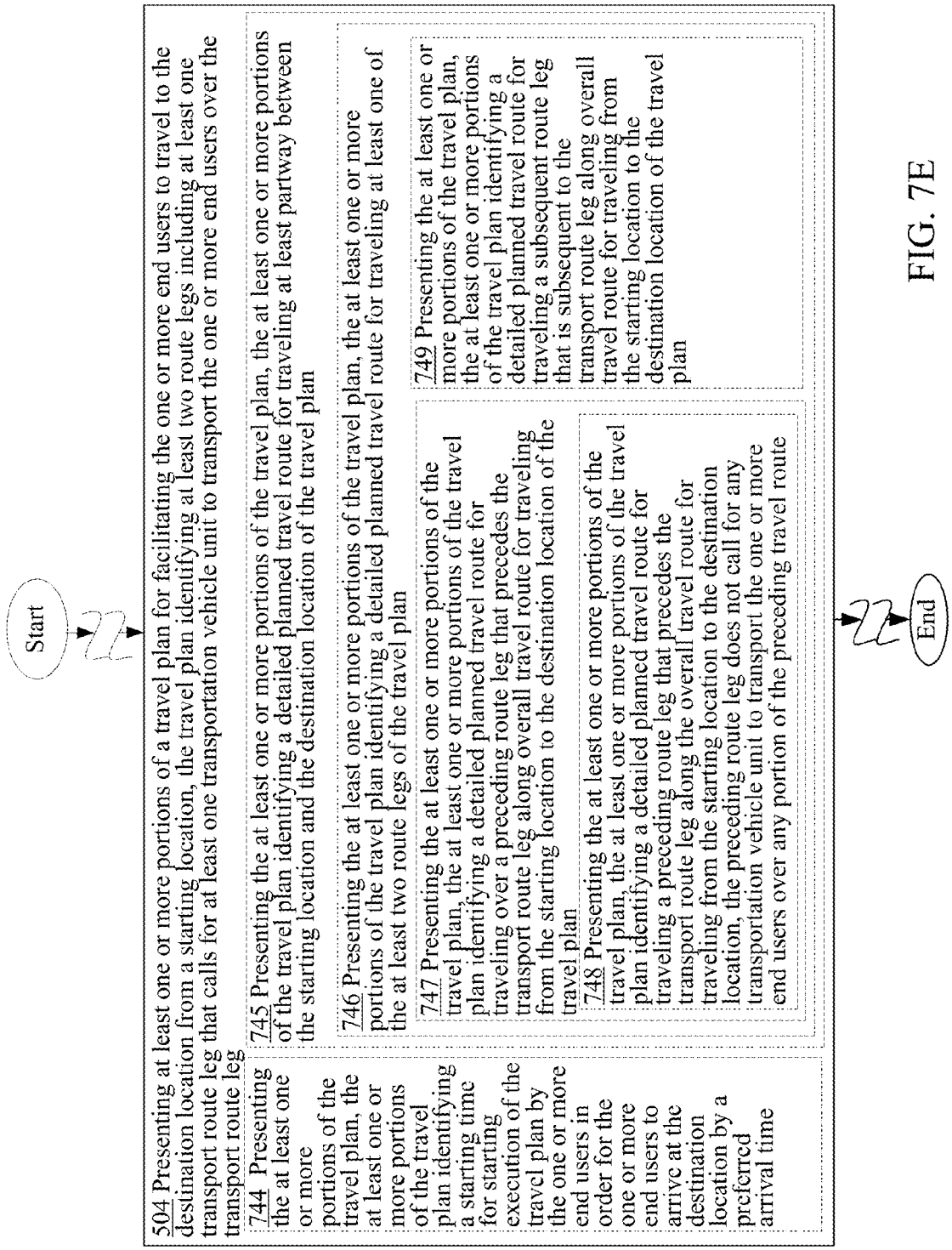
FIG. 7E is a high-level logic flowchart of a process depicting alternate implementations of the travel plan presenting operation 504 of FIG. 5.

Referring now to FIG. 7E, in various implementations, the travel plan presenting operation 504 may include an operation 744 for presenting the at least one or more portions of the travel plan, the at least one or more portions of the travel plan identifying a starting time for starting execution of the travel plan by the one or more end users in order for the one or more end users to arrive at the destination location by a preferred arrival time. For instance, the travel plan providing module 204* of the end user device 10* of FIG. 2A or 2B presenting or providing the at least one or more portions of the travel plan 400*, the at least one or more portions of the travel plan 400* identifying a starting time for starting execution of the travel plan by the one or more end users 12 in order for the one or more end users 12 to arrive at the destination location by a preferred arrival time (e.g., as preferred by an end user 12).

In the same or alternative implementations, the travel plan presenting operation 504 may additionally or alternatively include an operation 745 for presenting the at least one or more portions of the travel plan, the at least one or more portions of the travel plan identifying a detailed planned travel route for traveling at least partway between the starting location and the destination location of the travel plan. For instance, the travel plan providing module 204* of the end user device 10* of FIG. 2A or 2B presenting or providing the at least one or more portions of the travel plan 400*, the at least one or more portions of the travel plan 400* identifying a detailed planned travel route (e.g., a detailed travel scheme or route that indicates turn-by-turn, road-by-road, and travel distances details for traveling at least a portion of the travel plan) for traveling at least partway (e.g., a route leg) between the starting location and the destination location of the travel plan 400*.

In some implementations, operation 745 may further include an operation 746 for presenting the at least one or more portions of the travel plan, the at least one or more portions of the travel plan identifying a detailed planned travel route for traveling at least one of the at least two route legs of the travel plan. For instance, the travel plan providing module 204* of the end user device 10* of FIG. 2A or 2B presenting or providing the at least one or more portions of the travel plan 400*, the at least one or more portions of the travel plan 400* identifying a detailed planned travel route for traveling at least one of the at least two route legs of the travel plan 400*.

In some implementations, operation 746 may include an operation 747 for presenting the at least one or more portions of the travel plan, the at least one or more portions of the travel plan identifying a detailed planned travel route for traveling over a preceding route leg that precedes the transport route leg along overall travel route for traveling from the starting location to the destination location of the travel plan. For instance, the travel plan providing module 204* of the end user device 10* of FIG. 2A or 2B presenting or providing the at least one or more portions of the travel plan (e.g., travel plan 400b of FIG. 4B), the at least one or more portions of the travel plan (e.g., travel plan 400b of FIG. 4B) identifying a detailed planned travel route for traveling over a preceding route leg (e.g., route leg 1 or 2 of FIG. 4B—see also FIG. 4C or 4D) that precedes the transport route leg (e.g., route leg 3 of FIG. 4B) along overall travel route for traveling from the starting location to the destination location of the travel plan (e.g., travel plan 400b of FIG. 4B).

In some implementations, operation 747 may, in turn, further include an operation 748 for presenting the at least one or more portions of the travel plan, the at least one or more portions of the travel plan identifying a detailed planned travel route for traveling a preceding route leg that precedes the transport route leg along the overall travel route for traveling from the starting location to the destination location, the preceding route leg does not call for any transportation vehicle unit to transport the one or more end users over any portion of the preceding travel route. For instance, the travel plan providing module 204* of the end user device 10* of FIG. 2A or 2B presenting or providing the at least one or more portions of the travel plan (e.g., travel plan 400b of FIG. 4B), the at least one or more portions of the travel plan (e.g., travel plan 400b of FIG. 4B) identifying a detailed planned travel route for traveling a preceding route leg (e.g., route leg 1 or 2 of FIG. 4B—see also FIG. 4C or 4D) that precedes the transport route leg (e.g., route leg 3 of FIG. 4B) along the overall travel route for traveling from the starting location to the destination location, the preceding route leg (e.g., route leg 1 or 2 of FIG. 4B—see also FIG. 4C or 4D) does not call for any transportation vehicle unit to transport the one or more end users 12 over any portion of the preceding travel route (e.g., route leg 1 or 2 of FIG. 4B—see also FIG. 4C or 4D).

As further illustrated, in some implementations, operation 746 may include an operation 749 for presenting the at least one or more portions of the travel plan, the at least one or more portions of the travel plan identifying a detailed planned travel route for traveling a subsequent route leg that is subsequent to the transport route leg along overall travel route for traveling from the starting location to the destination location of the travel plan. For instance, the travel plan providing module 204* of the end user device 10* of FIG. 2A or 2B presenting or providing the at least one or more portions of the travel plan (e.g., travel plan 400f), the at least one or more portions of the travel plan (e.g., travel plan 400o identifying a detailed planned travel route for traveling a subsequent route leg (e.g., route leg 2 or 3 of FIG. 4F) that is subsequent to the transport route leg (e.g., route leg 1 of FIG. 4G) along overall travel route for traveling from the starting location to the destination location of the travel plan (e.g., travel plan 400g of FIG. 4G).

Figure 7F:
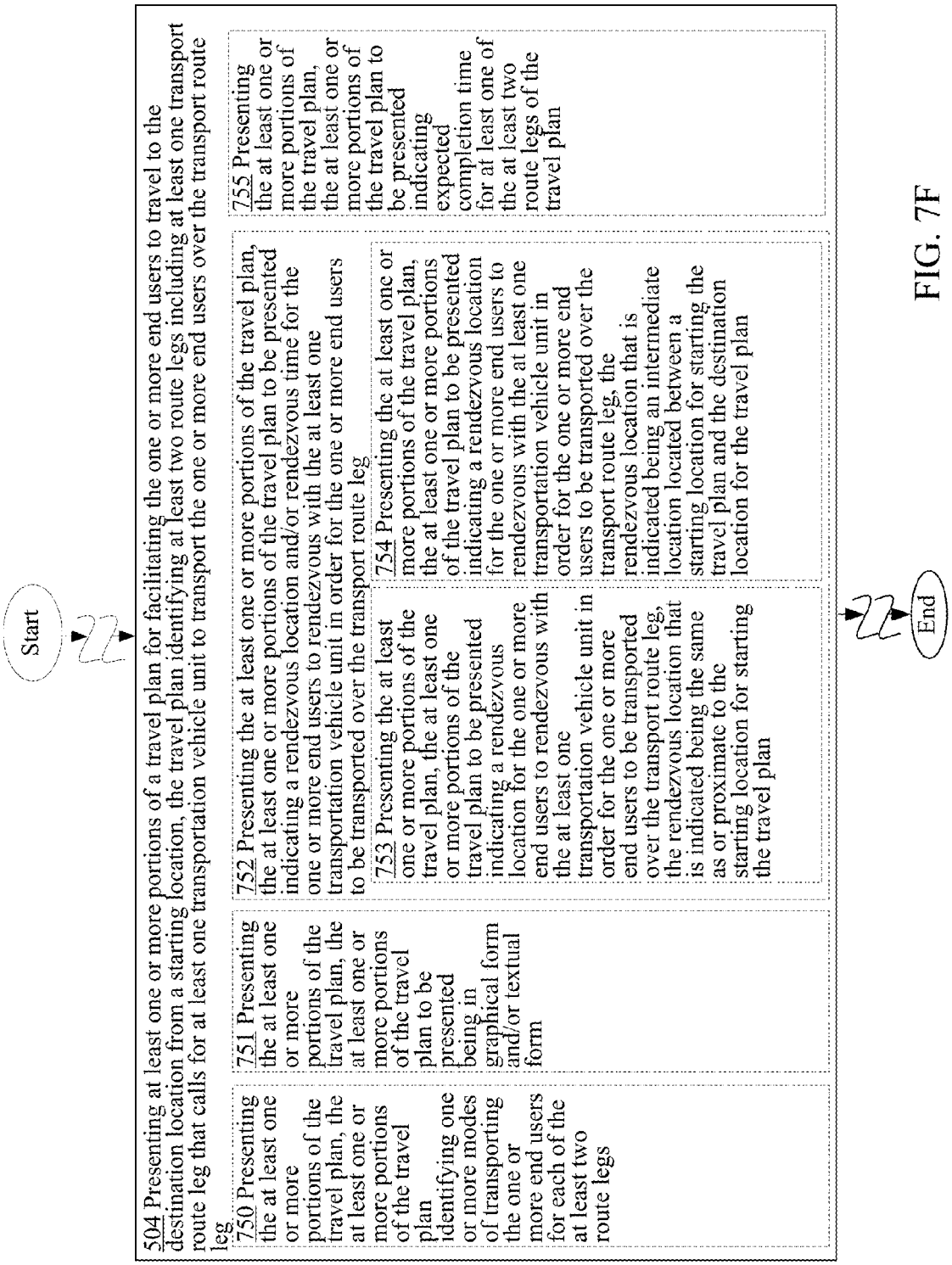
FIG. 7F is a high-level logic flowchart of a process depicting alternate implementations of the travel plan presenting operation 504 of FIG. 5.

Turning to FIG. 7F, in various implementations, the travel plan presenting operation 504 may include an operation 750 for presenting the at least one or more portions of the travel plan, the at least one or more portions of the travel plan identifying one or more modes of transporting the one or more end users for each of the at least two route legs. For instance, the travel plan providing module 204* of the end user device 10* of FIG. 2A or 2B presenting or providing the at least one or more portions of the travel plan 400*, the at least one or more portions of the travel plan 400* identifying one or more modes of transporting (e.g., walking, ferry, transportation vehicle unit, etc.) the one or more end users 12 for each of the at least two route legs.

In the same or different implementations, the travel plan presenting operation 504 may additionally or alternatively include an operation 751 for presenting the at least one or more portions of the travel plan, the at least one or more portions of the travel plan to be presented being in graphical form and/or textual form. For instance, the travel plan providing module 204* of the end user device 10* of FIG. 2A or 2B presenting or providing the at least one or more portions of the travel plan 400*, the at least one or more portions of the travel plan 400* to be presented being in graphical form and/or textual form. In alternative implementations, the travel plan 100* may be presented in audible form.

In the same or different implementations, the travel plan presenting operation 504 may additionally or alternatively include an operation 752 for presenting the at least one or more portions of the travel plan, the at least one or more portions of the travel plan to be presented indicating a rendezvous location and/or rendezvous time for the one or more end users to rendezvous with the at least one transportation vehicle unit in order for the one or more end users to be transported over the transport route leg. For instance, the travel plan providing module 204* of the end user device 10* of FIG. 2A or 2B presenting or providing the at least one or more portions of the travel plan, the at least one or more portions of the travel plan 400* to be presented or provided indicating a rendezvous location and/or rendezvous time for the one or more end users 12 to rendezvous with the at least one transportation vehicle unit 20* in order for the one or more end users 12 to be transported over the transport route leg.

As further illustrated, in some implementations, operation 752 may further include an operation 753 for presenting the at least one or more portions of the travel plan, the at least one or more portions of the travel plan to be presented indicating a rendezvous location for the one or more end users to rendezvous with the at least one transportation vehicle unit in order for the one or more end users to be transported over the transport route leg, the rendezvous location that is indicated being the same as or proximate to the starting location for starting the travel plan. For instance, the travel plan providing module 204* of the end user device 10* of FIG. 2A or 2B presenting or providing the at least one or more portions of the travel plan (e.g., travel plan 400f of FIG. 4F), the at least one or more portions of the travel plan (e.g., travel plan 400f of FIG. 4F) to be presented or provided indicating a rendezvous location for the one or more end users 12 to rendezvous with the at least one transportation vehicle unit 20* in order for the one or more end users 12 to be transported over the transport route leg (e.g., route leg 1 of FIG. 4F), the rendezvous location that is indicated being the same as or proximate to the starting location for starting the travel plan (e.g., travel plan 400f).

In some alternative implementations, operation 752 may include an operation 754 for presenting the at least one or more portions of the travel plan, the at least one or more portions of the travel plan to be presented indicating a rendezvous location for the one or more end users to rendezvous with the at least one transportation vehicle unit in order for the one or more end users to be transported over the transport route leg, the rendezvous location that is indicated being an intermediate location located between a starting location for starting the travel plan and the destination location for the travel plan. For instance, the travel plan providing module 204* of the end user device 10* of FIG. 2A or 2B presenting or providing the at least one or more portions of the travel plan (e.g., travel plan 400a, 400b, or 400g of FIG. 4A, 4B, or 4G), the at least one or more portions of the travel plan (e.g., travel plan 400a, 400b, or 400g) to be presented or provided indicating a rendezvous location for the one or more end users 12 to rendezvous with the at least one transportation vehicle unit in order for the one or more end users 12 to be transported over the transport route leg (e.g., route leg 3 of FIG. 4A or 4B, or route leg 2 of FIG. 4G), the rendezvous location that is indicated being an intermediate location located between a starting location for starting the travel plan (e.g., travel plan 400a, 400b, or 400g) and the destination location for the travel plan (e.g., travel plan 400a, 400b, or 400g).

In various implementations, the travel plan presenting operation 504 may include an operation 755 for presenting the at least one or more portions of the travel plan, the at least one or more portions of the travel plan to be presented indicating expected completion time for at least one of the at least two route legs of the travel plan. For instance, the travel plan providing module 204* of the end user device 10* of FIG. 2A or 2B presenting or providing the at least one or more portions of the travel plan 400* (see, for example, FIG. 4A, 4B, 4F, or 4G), the at least one or more portions of the travel plan 400* to be presented or provided indicating expected completion times (note that in FIGS. 4A, 4B, 4F, and 4G, the expected completion times of each route leg is indicated as "expected arrival time" or as "estimated arrival time at destination location") for at least one of the at least two route legs of the travel plan 400*.

Figure 7G:
FIG. 7G is a high-level logic flowchart of a process depicting alternate implementations of the travel plan presenting operation 504 of FIG. 5.

Referring now to FIG. 7G, in the same or alternative implementations, the travel plan presenting operation 504 may additionally or alternatively an operation 756 for presenting the at least one or more portions of the travel plan, the at least one or more portions of the travel plan to be presented indicating starting point and end point for at least one of the at least two route legs. For instance, the travel plan providing module 204* of the end user device 10* of FIG. 2A or 2B presenting or providing the at least one or more portions of the travel plan 400* (e.g., travel plan 400a, 400b, 400f, or 400g of FIG. 4A, 4B, 4F, or 4G), the at least one or more portions of the travel plan 400* to be presented or provided indicating starting point and end point for at least one of the at least two route legs.

In the same or alternative implementations, the travel plan presenting operation 504 may additionally or alternatively an operation 757 for presenting the at least one or more portions of the travel plan, the at least one or more portions of the travel plan to be presented identifying the at least one transport route leg and a first route leg that is identified as not calling for any transportation vehicle unit to transport the one or more end users over any portion of the first route leg, the at least one transport route leg being a second route leg that calls for the at least one transportation vehicle unit to transport the one or more end users over the second route leg. For instance, the travel plan providing module 204* of the end user device 10* of FIG. 2A or 2B presenting or providing the at least one or more portions of the travel plan, the at least one or more portions of the travel plan (e.g., travel plan 400a, 400b, or 400f of FIG. 4A, 4B, or 4F) to be presented or provided identifying the at least one transport route leg (e.g., route leg 3 of FIG. 4A or 4B, or route leg 1 of FIG. 4F) and a first route leg (e.g., route leg 1 or 2 of FIG. 4A or 4B, or route leg 2 or 3 of FIG. 4F) that is identified as not calling for any transportation vehicle unit 20* to transport the one or more end users 12 over any portion of the first route leg (e.g., route leg 1 or 2 of FIG. 4A or 4B, or route leg 2 or 3 of FIG. 4F), the at least one transport route leg being a second route leg that calls for the at least one transportation vehicle unit 20* to transport the one or more end users 12 over the second route leg (e.g., route leg 3 of FIG. 4A or 4B, or route leg 1 of FIG. 4F).

As further illustrated in FIG. 7G, in some implementations, operation 757 may further include an operation 758 for presenting the at least one or more portions of the travel plan, the at least one or more portions of the travel plan to be presented identifying the first route leg that is identified as not calling for any transportation vehicle unit to transport the one or more end users over any portion of the first route leg and the second route leg that calls for at least one transportation vehicle unit to transport the one or more end users over the second route leg, the first route leg identified as calling for the one or more end users to travel over the first route leg by walking, by bicycling, by mass transit, and/or by ferry. For instance, the travel plan providing module 204* of the end user device 10* of FIG. 2A or 2B presenting or providing the at least one or more portions of the travel plan (e.g., travel plan 400a, 400b, or 400f of FIG. 4A, 4B, or 4F), the at least one or more portions of the travel plan (e.g., travel plan 400a, 400b, or 400f) to be presented or provided identifying the first route leg (e.g., route leg 1 or 2 of FIG. 4A or 4B, or route leg 2 or 3 of FIG. 4F) that is identified as not calling for any transportation vehicle unit 20* to transport the one or more end users 12 over any portion of the first route leg and the second route leg (e.g., route leg 3 of FIG. 4A or 4B, or route leg 1 of FIG. 4F) that calls for at least one transportation vehicle unit 20* to transport the one or more end users 12 over the second route leg, the first route leg identified as calling for the one or more end users 12 to travel over the first route leg by walking, by bicycling, by mass transit, and/or by ferry.

In some implementations, operation 757 may include an operation 759 for presenting the at least one or more portions of the travel plan, the at least one or more portions of the travel plan to be presented identifying the first route leg that is identified as not calling for any transportation vehicle unit to transport the one or more end users over any portion of the first route leg and the second route leg that calls for the at least one transportation vehicle unit to transport the one or more end user over the second route leg, the first route leg identified as preceding the second route leg along an overall travel route for traveling from the starting location to the destination location of the travel plan. For instance, the travel plan providing module 204* of the end user device 10* of FIG. 2A or 2B presenting or providing the at least one or more portions of the travel plan (e.g., travel plan 400a or 400b of FIG. 4A or 4B), the at least one or more portions of the travel plan (e.g., travel plan 400a or 400b) to be presented or provided identifying the first route leg (e.g., route leg 1 or 2 of FIG. 4A or 4B) that is identified as not calling for any transportation vehicle unit 20* to transport the one or more end users 12 over any portion of the first route leg (e.g., route leg 1 or 2 of FIG. 4A or 4B) and the second route leg (e.g., route leg 3 of FIG. 4A or 4B) that calls for the at least one transportation vehicle unit 20* to transport the one or more end user 12 over the second route leg (e.g., route leg 3 of FIG. 4A or 4B), the first route leg (e.g., route leg 1 or 2 of FIG. 4A or 4B) identified as preceding the second route leg (e.g., route leg 3 of FIG. 4A or 4B) along an overall travel route for traveling from the starting location to the destination location of the travel plan (e.g., travel plan 400a or 400b).

In some implementations, operation 757 may include an operation 760 for presenting the at least one or more portions of the travel plan, the at least one or more portions of the travel plan to be presented identifying the first route leg that is identified as not calling for any transportation vehicle unit to transport the one or more end users over any portion of the first route leg and the second route leg that calls for the at least one transportation vehicle unit to transport the one or more end users over the second route leg, the first route leg identified as being immediately following the second route leg along an overall travel route for traveling from the starting location to the destination location of the travel plan. For instance, the travel plan providing module 204* of the end user device 10* of FIG. 2A or 2B presenting or providing the at least one or more portions of the travel plan (e.g., travel plan 400f of FIG. 4F), the at least one or more portions of the travel plan (e.g., travel plan 400f) to be presented or provided identifying the first route leg (e.g., route leg 2 of FIG. 4F) that is identified as not calling for any transportation vehicle unit 20* to transport the one or more end users 12 over any portion of the first route leg (e.g., route leg 2 of FIG. 4F) and the second route leg (e.g., route leg 1 of FIG. 4F) that calls for the at least one transportation vehicle unit to transport the one or more end users 12 over the second route leg (e.g., route leg 1 of FIG. 4F), the first route leg (e.g., route leg 2 of FIG. 4F) identified as being immediately following the second route leg (e.g., route leg 1 of FIG. 4F) along an overall travel route for traveling from the starting location to the destination location of the travel plan (e.g., travel plan 400f).

Figure 7H:
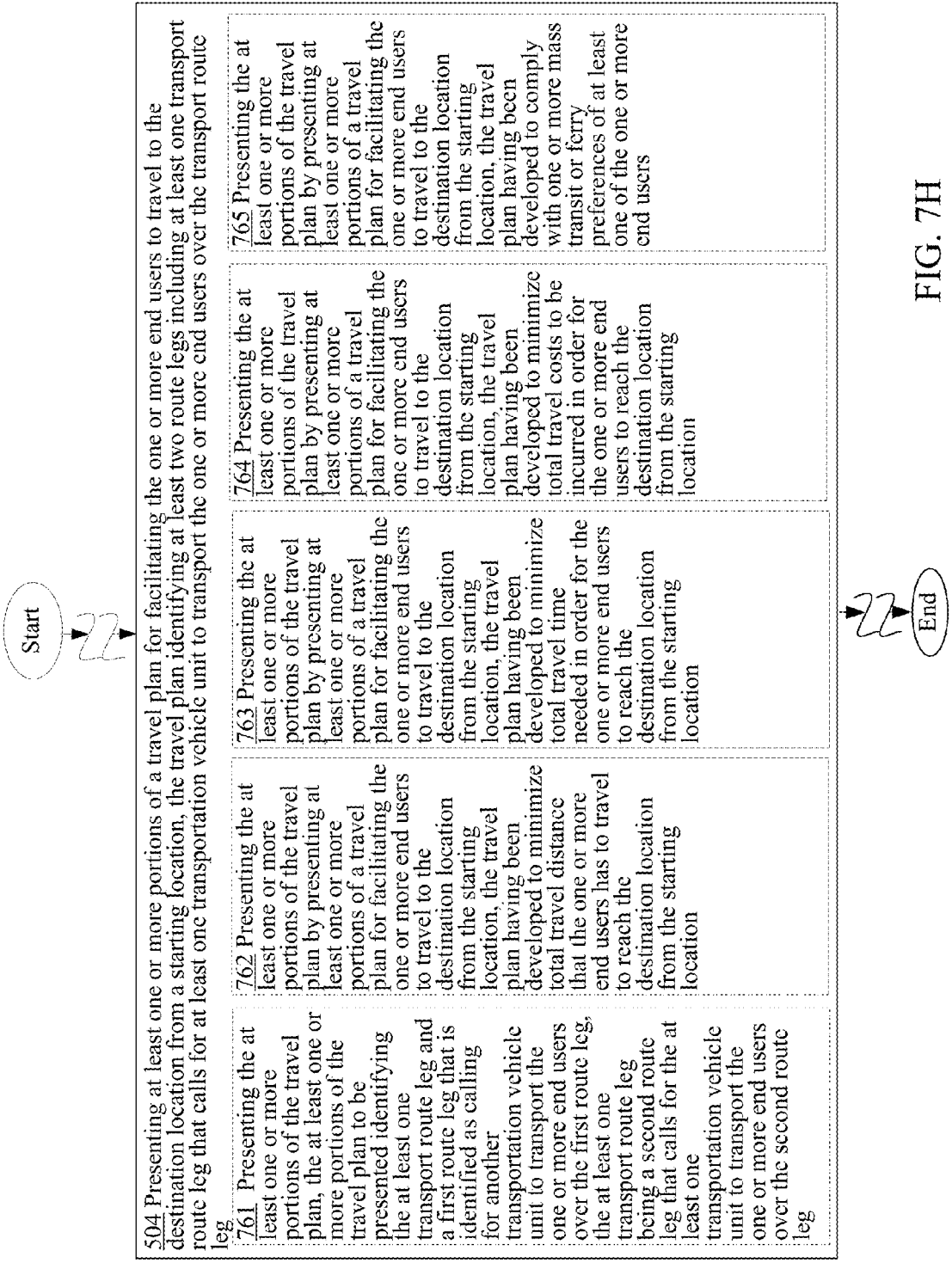
FIG. 7H is a high-level logic flowchart of a process depicting alternate implementations of the travel plan presenting operation 504 of FIG. 5.

In various implementations, the travel plan presenting operation 504 may include an operation 761 for presenting the at least one or more portions of the travel plan, the at least one or more portions of the travel plan to be presented identifying the at least one transport route leg and a first route leg that is identified as calling for another transportation vehicle unit to transport the one or more end users over the first route leg, the at least one transport route leg being a second route leg that calls for the at least one transportation vehicle unit to transport the one or more end users over the second route leg as illustrated in FIG. 7H. For instance, the travel plan providing module 204* of the end user device 10* of FIG. 2A or 2B presenting or providing the at least one or more portions of the travel plan (e.g., travel plan 400g of FIG. 4G), the at least one or more portions of the travel plan (e.g., travel plan 400g) to be presented or provided identifying the at least one transport route leg (e.g., route leg 2 of FIG. 4G) and a first route leg (e.g., route leg 1 of FIG. 4G) that is identified as calling for another transportation vehicle unit 20* to transport the one or more end users 12 over the first route leg (e.g., route leg 1 of FIG. 4G), the at least one transport route leg being a second route leg (e.g., route leg 2 of FIG. 4G) that calls for the at least one transportation vehicle unit 20* to transport the one or more end users 12 over the second route leg (e.g., route leg 2 of FIG. 4G).

In some implementations, the travel plan presenting operation 504 may include an operation 762 for presenting the at least one or more portions of the travel plan by presenting at least one or more portions of a travel plan for facilitating the one or more end users to travel to the destination location from the starting location, the travel plan having been developed to minimize total travel distance that the one or more end users has to travel to reach the destination location from the starting location. For instance, the travel plan providing module 204* of the end user device 10* of FIG. 2A or 2B presenting the at least one or more portions of the travel plan by presenting or providing at least one or more portions of a travel plan 400* for facilitating the one or more end users 12 to travel to the destination location from the starting location, the travel plan 400* having been developed (e.g., as developed locally by the distance minimizing travel plan developing module 316 of the end user device 10* or as developed externally) to minimize total travel distance that the one or more end users 12 has to travel to reach the destination location from the starting location.

In some implementations, the travel plan presenting operation 504 may include an operation 763 for presenting the at least one or more portions of the travel plan by presenting at least one or more portions of a travel plan for facilitating the one or more end users to travel to the destination location from the starting location, the travel plan having been developed to minimize total travel time needed in order for the one or more end users to reach the destination location from the starting location. For instance, the travel plan providing module 204* of the end user device 10* of FIG. 2A or 2B presenting the at least one or more portions of the travel plan 400* by presenting or providing at least one or more portions of a travel plan 400* for facilitating the one or more end users 12 to travel to the destination location from the starting location, the travel plan 400* having been developed (e.g., as developed locally by the travel time minimizing travel plan developing module 318 of the end user device 10* or as developed externally) to minimize total travel time needed in order for the one or more end users 12 to reach the destination location from the starting location.

In some implementations, the travel plan presenting operation 504 may include an operation 764 for presenting the at least one or more portions of the travel plan by presenting at least one or more portions of a travel plan for facilitating the one or more end users to travel to the destination location from the starting location, the travel plan having been developed to minimize total travel costs to be incurred in order for the one or more end users to reach the destination location from the starting location. For instance, the travel plan providing module 204* of the end user device 10* of FIG. 2A or 2B presenting the at least one or more portions of the travel plan 400* by presenting or providing at least one or more portions of a travel plan 400* for facilitating the one or more end users 12 to travel to the destination location from the starting location, the travel plan 400* having been developed (e.g., as developed locally by the travel cost minimizing travel plan developing module 320 of the end user device 10* or as developed externally) to minimize total travel costs to be incurred in order for the one or more end users 12 to reach the destination location from the starting location.

In some implementations, the travel plan presenting operation 504 may include an operation 765 for presenting the at least one or more portions of the travel plan by presenting at least one or more portions of a travel plan for facilitating the one or more end users to travel to the destination location from the starting location, the travel plan having been developed to comply with one or more mass transit or ferry preferences of at least one of the one or more end users. For instance, the travel plan providing module 204* of the end user device 10* of FIG. 2A or 2B presenting the at least one or more portions of the travel plan 400 by presenting or providing at least one or more portions of a travel plan 400* for facilitating the one or more end users 12 to travel to the destination location from the starting location, the travel plan 400* having been developed (e.g., as developed locally by the mass transmit/ferry preference compliant travel plan developing module 322 of the end user device 10* or as developed externally) to comply with one or more mass transit or ferry preferences (e.g., preference for a particular ferry or bus departing from a particular location or locations and/or departing at particular time or times) of at least one of the one or more end users.

Figure 7I:
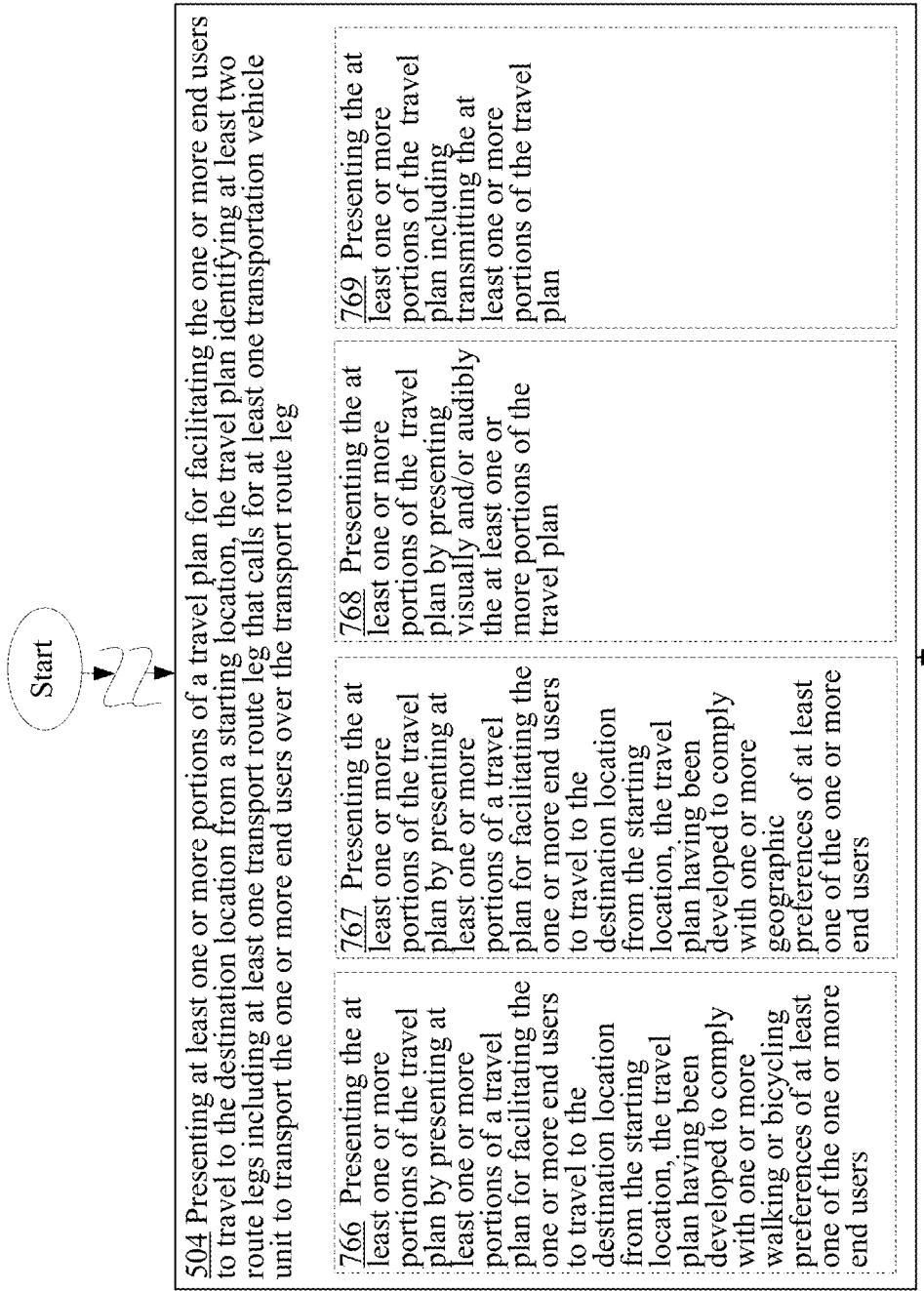
FIG. 7I is a high-level logic flowchart of a process depicting alternate implementations of the travel plan presenting operation 504 of FIG. 5.

In some implementations, the travel plan presenting operation 504 may include an operation 766 for presenting the at least one or more portions of the travel plan by presenting at least one or more portions of a travel plan for facilitating the one or more end users to travel to the destination location from the starting location, the travel plan having been developed to comply with one or more walking or bicycling preferences of at least one of the one or more end users as illustrated in FIG. 7I. For instance, the travel plan providing module 204* of the end user device 10* of FIG. 2A or 2B presenting the at least one or more portions of the travel plan 400* by presenting or providing at least one or more portions of a travel plan 400* for facilitating the one or more end users 12 to travel to the destination location from the starting location, the travel plan 400* having been developed (e.g., as developed locally by the walking/bicycling preference compliant travel plan developing module 324 of the end user device 10* or as developed externally) to comply with one or more walking or bicycling preferences (e.g., preferences that there is minimal walking) of at least one of the one or more end users 12.

In some implementations, the travel plan presenting operation 504 may include an operation 767 for presenting the at least one or more portions of the travel plan by presenting at least one or more portions of a travel plan for facilitating the one or more end users to travel to the destination location from the starting location, the travel plan having been developed to comply with one or more geographic preferences of at least one of the one or more end users. For instance, the travel plan providing module 204* of the end user device 10* of FIG. 2A or 2B presenting the at least one or more portions of the travel plan by presenting or providing at least one or more portions of a travel plan 400* for facilitating the one or more end users 12 to travel to the destination location from the starting location, the travel plan 400* having been developed (e.g., as developed locally by the geographic preference compliant travel plan developing module 326 of the end user device 10* or as developed externally) to comply with one or more geographic preferences (e.g., preferences that the one or more end users 12 be routed through or picked up at a particular geographic location or area, or to avoid certain geographic locations or roads) of at least one of the one or more end users 12.

In some implementations, the travel plan presenting operation 504 may include an operation 768 for presenting the at least one or more portions of the travel plan by presenting visually and/or audibly the at least one or more portions of the travel plan. For instance, the travel plan providing module 204* of the end user device 10* of FIG. 2A or 2B presenting the at least one or more portions of the travel plan 400* by presenting visually and/or audibly, via the user interface 250, the at least one or more portions of the travel plan 400*.

In some implementations, the travel plan presenting operation 504 may include an operation 769 for presenting the at least one or more portions of the travel plan including transmitting the at least one or more portions of the travel plan. For instance, the travel plan providing module 204* including the travel plan transmitting module 330 (see FIG. 3B) of the end user device 10* of FIG. 2A or 2B presenting the at least one or more portions of the travel plan 400* including transmitting, by the travel plan transmitting module 330, the at least one or more portions of the travel plan 400* via, for example, one or more wireless and/or wired networks 16.

Figure 8:
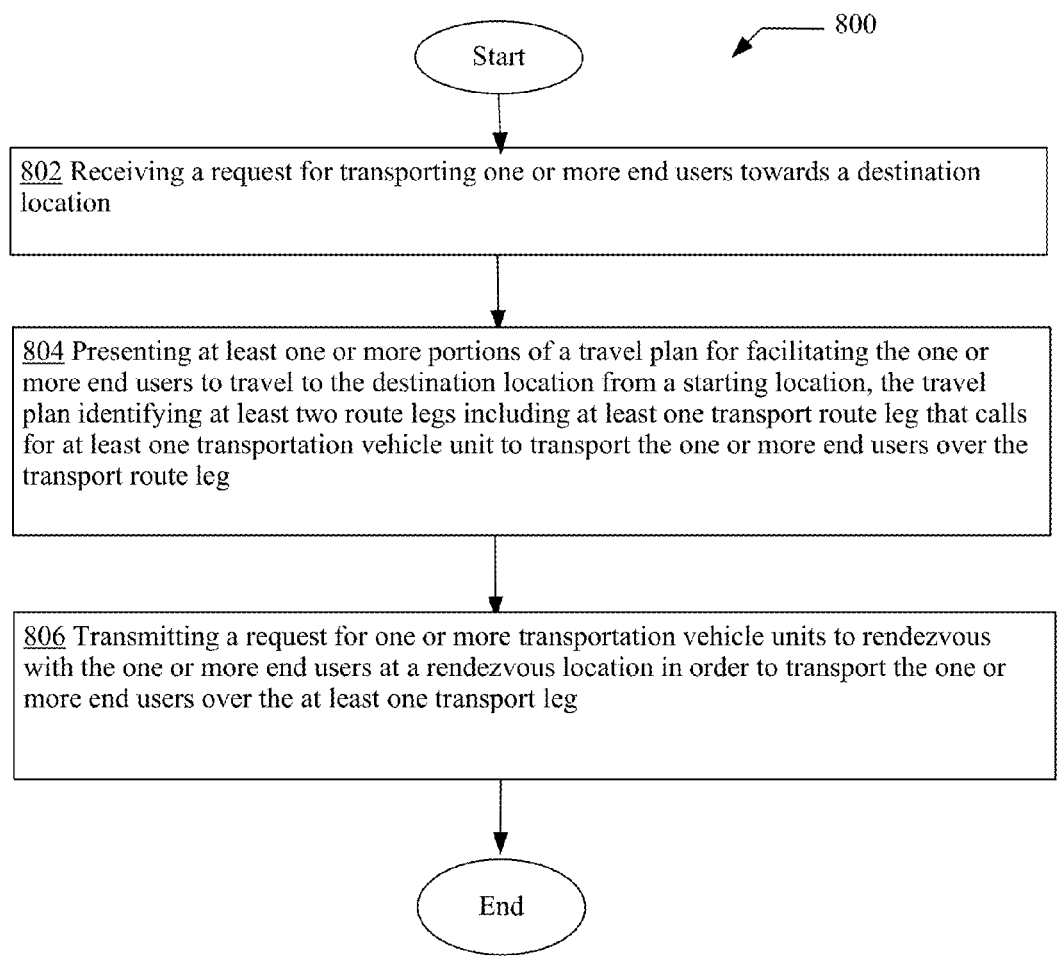
FIG. 8 is a high-level logic flowchart of a process, e.g., operational flow 800, according to some embodiments.

Turning now to FIG. 8 illustrating another operational flow 800. Operational flow 800 includes certain operations that mirror the operations included in operational flow 500 of FIG. 5. These operations include a request receiving operation 802 and a travel plan presenting operation 804 that corresponds to and mirrors the request receiving operation 502 and the travel plan presenting operation 504, respectively, of FIG. 5.

In addition, operational flow 800 further includes a transportation vehicle unit request transmitting operation 806 for transmitting a request for one or more transportation vehicle units to rendezvous with the one or more end users at a rendezvous location in order to transport the one or more end users over the at least one transport leg. For instance, the transportation vehicle unit request transmitting module 206* of the end user device 10* of FIG. 2A or 2B transmitting, via one or more wireless and/or wired networks 16, a request for one or more transportation vehicle units 20* to rendezvous with the one or more end users 12 at a rendezvous location in order to transport the one or more end users 12 over the at least one transport leg.

Figure 9A:
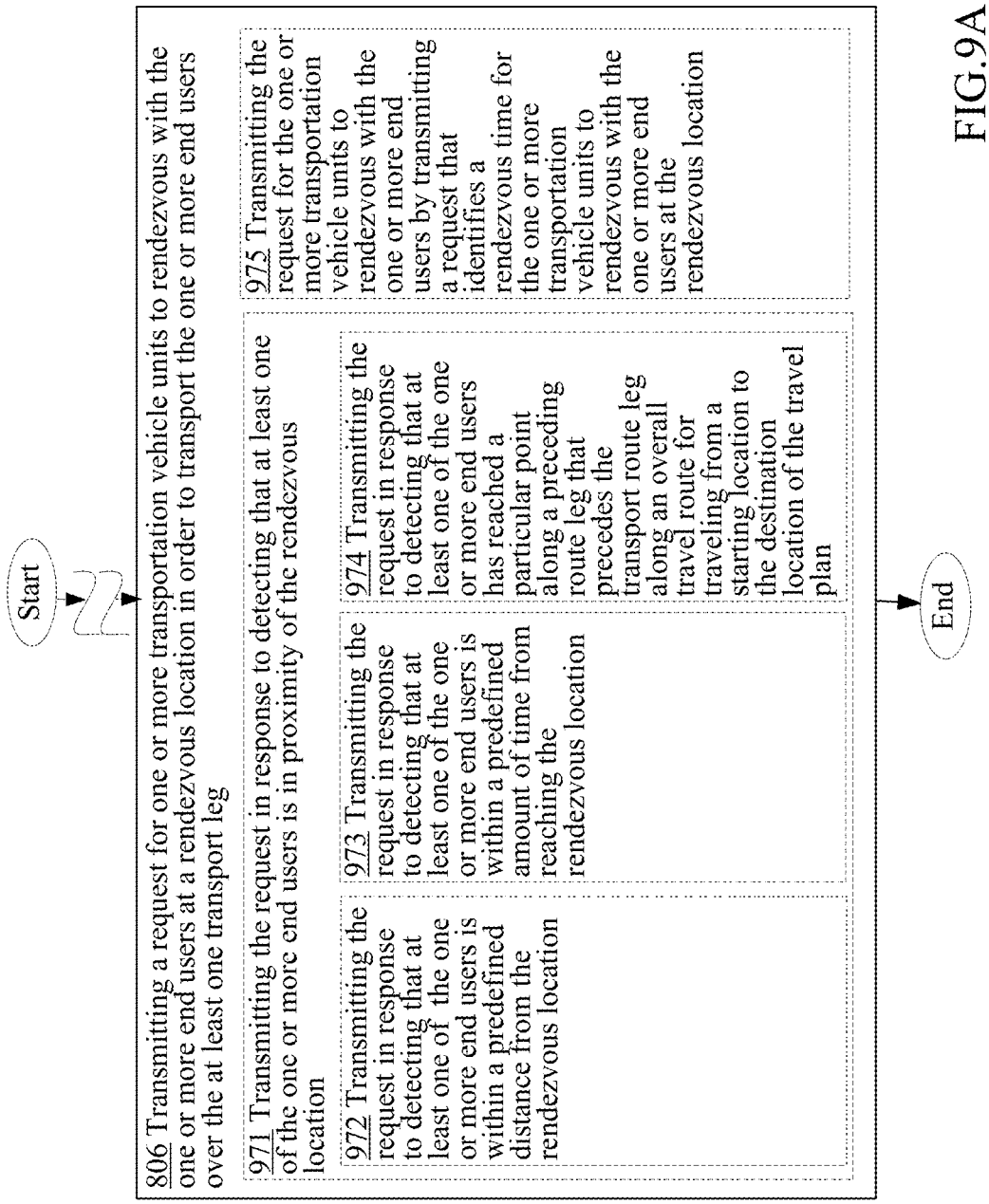
FIG. 9A is a high-level logic flowchart of a process depicting alternate implementations of the transportation vehicle unit request transmitting operation 806 of FIG. 8.
Figure 9B:
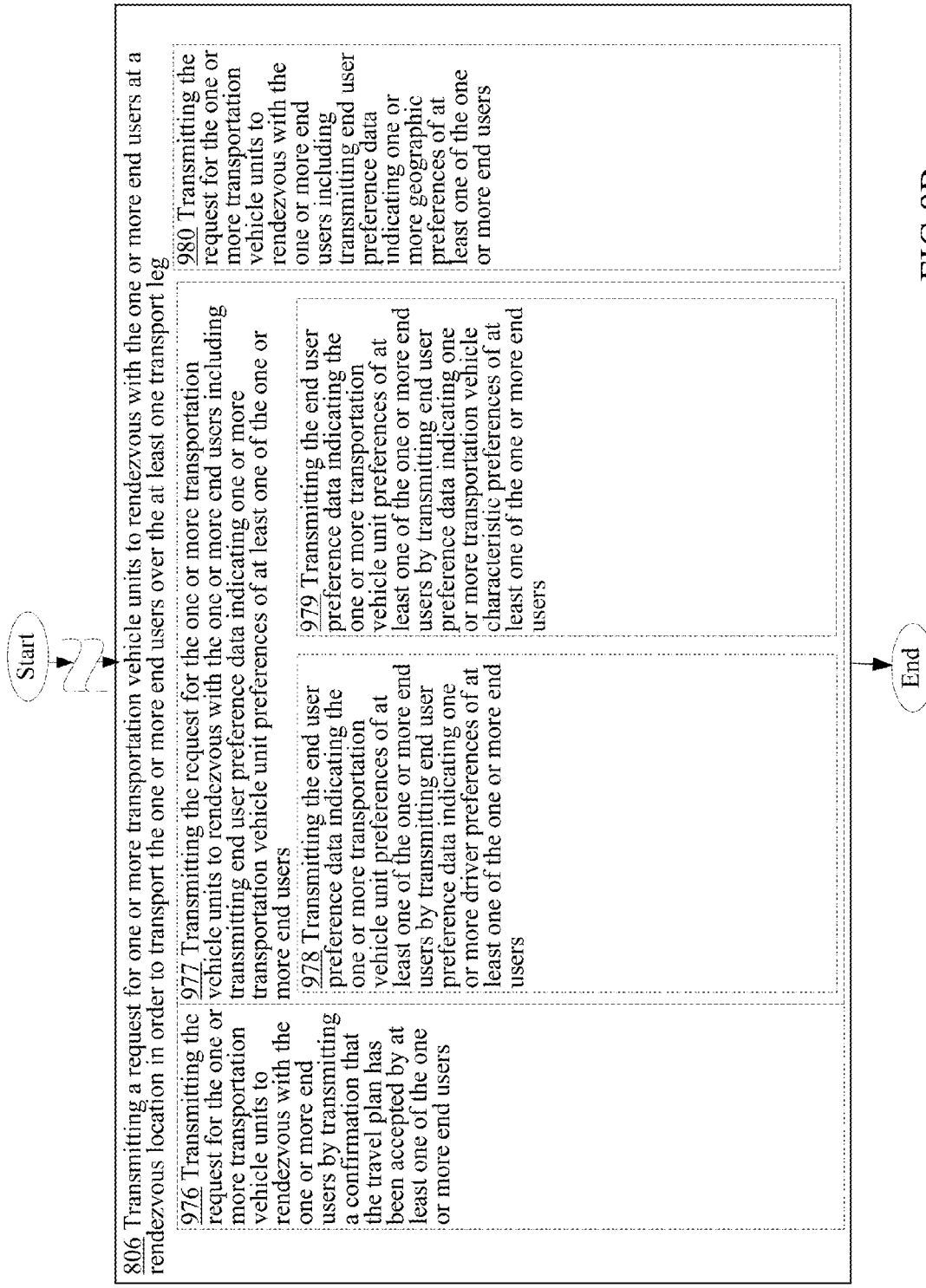
FIG. 9B is a high-level logic flowchart of a process depicting alternate implementations of the transportation vehicle unit request transmitting operation 806 of FIG. 8.

As further illustrated in FIGS. 9A and 9B, the transportation vehicle unit request transmitting operation 806 of FIG. 8 may be implemented in a variety of different ways. For example, in some cases, the transportation vehicle unit request transmitting operation 806 may include an operation 971 for transmitting the request in response to detecting that at least one of the one or more end users is in proximity of the rendezvous location as illustrated in FIG. 9A. For instance, the transportation vehicle unit request transmitting module 206* including the end user proximity detecting module 332 (see, for example, FIG. 3C) of the end user device 10* of FIG. 2A or 2B transmitting the request in response to the end user proximity detecting module 332 detecting that at least one of the one or more end users 12 is in proximity of the rendezvous location. In some embodiments the detection that at least one of the one or more end users 12 are in proximity of the rendezvous location may be based on GPS data provided by a mobile device (which may be the end user device 10*) carried by the at least one of the one or more end users 12.

In some implementations, operation 971 may include an operation 972 for transmitting the request in response to detecting that at least one of the one or more end users is within a predefined distance from the rendezvous location. For instance, the transportation vehicle unit request transmitting module 206* including the end user proximity detecting module 332 of the end user device 10* of FIG. 2A or 2B transmitting the request in response to the end user proximity detecting module 332 detecting that at least one of the one or more end users 12 is within a predefined distance (e.g., within 1 miles, within half a mile, within 500 yards, etc.) from the rendezvous location.

In some implementations, operation 971 may include an operation 973 for transmitting the request in response to detecting that at least one of the one or more end users is within a predefined amount of time from reaching the rendezvous location. For instance, the transportation vehicle unit request transmitting module 206* including the end user proximity detecting module 332 of the end user device 10* of FIG. 2A or 2B transmitting the request in response to the end user proximity detecting module 332 detecting (e.g., detecting based, at least in part, on GPS data) that at least one of the one or more end users 12 is within a predefined amount of time from reaching the rendezvous location. For example, if the one or more end users 12 is determined to be, for example, 10 minutes or less away from reaching the rendezvous location, the request may then be transmitted.

In some implementations, operation 971 may include an operation 974 for transmitting the request in response to detecting that at least one of the one or more end users has reached a particular point along a preceding route leg that precedes the transport route leg along an overall travel route for traveling from a starting location to the destination location of the travel plan. For instance, the transportation vehicle unit request transmitting module 206* including the end user proximity detecting module 332 of the end user device 10* of FIG. 2A or 2B transmitting the request in response to the end user proximity detecting module 332 detecting (e.g., detecting based, at least in part, on GPS data) that at least one of the one or more end users 12 has reached a particular point along a preceding route leg (e.g., route leg 2 of FIG. 4A or 4B) that precedes the transport route leg (e.g., route leg 3 of FIG. 4A or 4B) along an overall travel route for traveling from a starting location to the destination location of the travel plan 400*.

In various implementations, the transportation vehicle unit request transmitting operation 806 may include an operation 975 for transmitting the request for the one or more transportation vehicle units to rendezvous with the one or more end users by transmitting a request that identifies a rendezvous time for the one or more transportation vehicle units to rendezvous with the one or more end users at the rendezvous location. For instance, the transportation vehicle unit request transmitting module 206* of the end user device 10* of FIG. 2A or 2B transmitting the request for the one or more transportation vehicle units 20* to rendezvous with the one or more end users 12 by transmitting a request that identifies a rendezvous time for the one or more transportation vehicle units 20* to rendezvous with the one or more end users 12 at the rendezvous location.

In some implementations, the transportation vehicle unit request transmitting operation 806 may include an operation 976 for transmitting the request for the one or more transportation vehicle units to rendezvous with the one or more end users by transmitting a confirmation that the travel plan has been accepted by at least one of the one or more end users. For instance, the transportation vehicle unit request transmitting module 206* including the travel plan confirmation transmitting module 334 (see, for example, FIG. 4C) of the end user device 10* of FIG. 2A or 2B transmitting the request for the one or more transportation vehicle units 20* to rendezvous with the one or more end users 12 by having the travel plan confirmation transmitting module 334 transmit a confirmation that the travel plan 400* has been accepted by at least one of the one or more end users 12.

In some implementations, the transportation vehicle unit request transmitting operation 806 may include an operation 977 for transmitting the request for the one or more transportation vehicle units to rendezvous with the one or more end users including transmitting end user preference data indicating one or more transportation vehicle unit preferences of at least one of the one or more end users. For instance, the transportation vehicle unit request transmitting module 206* including the end user preference data transmitting module 336 (see, for example, FIG. 4C) of the end user device 10* of FIG. 2A or 2B transmitting the request for the one or more transportation vehicle units 20* to rendezvous with the one or more end users 12 including transmitting, by the end user preference data transmitting module 336, end user preference data indicating one or more transportation vehicle unit preferences of at least one of the one or more end users 12.

In some implementations, operation 977 may include an operation 978 for transmitting the end user preference data indicating the one or more transportation vehicle unit preferences of at least one of the one or more end users by transmitting end user preference data indicating one or more driver preferences of at least one of the one or more end users. For instance, the end user preference data transmitting module 336 of the end user device 10* of FIG. 2A or 2B transmitting the end user preference data indicating the one or more transportation vehicle unit preferences of at least one of the one or more end users 12 by transmitting end user preference data indicating one or more driver preferences (e.g., human driver having certain characteristics such as gender, interest, and so forth, or preference for specific identified drivers) of at least one of the one or more end users 12.

In some implementations, operation 977 may include an operation 979 for transmitting the end user preference data indicating the one or more transportation vehicle unit preferences of at least one of the one or more end users by transmitting end user preference data indicating one or more transportation vehicle characteristic preferences of at least one of the one or more end users. For instance, the end user preference data transmitting module 336 of the end user device 10* of FIG. 2A or 2B transmitting the end user preference data indicating the one or more transportation vehicle unit preferences of at least one of the one or more end users 12 by transmitting end user preference data indicating one or more transportation vehicle characteristic preferences (e.g., preference for specific models, luggage space, leg room, and so forth) of at least one of the one or more end users 12.

In some implementations, the transportation vehicle unit request transmitting operation 806 may an operation 980 for transmitting the request for the one or more transportation vehicle units to rendezvous with the one or more end users including transmitting end user preference data indicating one or more geographic preferences of at least one of the one or more end users. For instance, the transportation vehicle unit request transmitting module 206* including the end user preference data transmitting module 336 of the end user device 10* of FIG. 2A or 2B transmitting the request for the one or more transportation vehicle units 20* to rendezvous with the one or more end users 12 including transmitting end user preference data indicating one or more geographic preferences (e.g., geographic preferences that certain locations and/or roads to be used for transporting the one or more end users 12 or as a rendezvous location) of at least one of the one or more end users 12.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to,"

"related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
   receiving a request for transporting one or more end users to a destination location from a starting location;
   presenting one or more portions of a travel plan for facilitating the one or more end users to travel to the destination location from the starting location, the travel plan identifying at least two route legs including at least one transport route leg that calls for at least one transportation vehicle unit to transport the one or more end users over the transport route leg;
   determining that at least one of the one or more end users is in proximity of a rendezvous location; and
   transmitting a request for one or more transportation vehicle units to rendezvous with the one or more end users at the rendezvous location in order to transport the one or more end users over the at least one transport route leg responsive to the detecting that the at least one of the one or more end users is in proximity of the rendezvous location,
   wherein at least one of the receiving, presenting, determining, or transmitting is at least partially implemented using at least one processing device.

2. A computationally-implemented system, comprising:
   circuitry configured for receiving a request for transporting one or more end users to a destination location from a starting location;
   circuitry configured for presenting one or more portions of a travel plan for facilitating the one or more end users to travel to the destination location from the starting location, the travel plan identifying at least two route legs including at least one transport route leg that calls for at least one transportation vehicle unit to transport the one or more end users over the transport route leg;
   circuitry configured for determining that at least one of the one or more end users is in proximity of a rendezvous location; and
   circuitry configured for transmitting a request for one or more transportation vehicle units to rendezvous with the one or more end users at the rendezvous location in order to transport the one or more end users over the at least one transport route leg responsive to the detecting that the at least one of the one or more end users is in proximity of the rendezvous location.

3. The computationally-implemented system of claim 2, wherein circuitry configured for receiving a request for transporting one or more end users to a destination location from a starting location comprises:
   circuitry configured for receiving one or more end user preferences that indicates one or more mass transit or ferry preferences for at least one of the one or more end users.

4. The computationally-implemented system of claim 2, wherein circuitry configured for receiving a request for transporting one or more end users to a destination location from a starting location comprises:
   circuitry configured for receiving one or more end user preferences that indicates one or more walking or bicycling preferences for at least one of the one or more end users.

5. The computationally-implemented system of claim 2, wherein circuitry configured for receiving a request for transporting one or more end users to a destination location from a starting location comprises:
   circuitry configured for receiving one or more end user preferences that indicates one or more geographic preferences for at least one of the one or more end users.

6. The computationally-implemented system of claim 5, wherein circuitry configured for receiving one or more end user preferences that indicates one or more geographic preferences for at least one of the one or more end users comprises:
   circuitry configured for receiving one or more end user preferences relating to one or more geographic locations or roads that the at least one of the one or more end users prefers to be not routed through.

7. The computationally-implemented system of claim 2, wherein circuitry configured for presenting one or more portions of a travel plan for facilitating the one or more end users to travel to the destination location from the starting location, the travel plan identifying at least two route legs including at least one transport route leg that calls for at least one transportation vehicle unit to transport the one or more end users over the transport route leg comprises:
    circuitry configured for developing the one or more portions of the travel plan.

8. The computationally-implemented system of claim 7, wherein circuitry configured for developing the one or more portions of the travel plan comprises:
    circuitry configured for determining a rendezvous location for the at least one transportation vehicle unit to rendezvous with the one or more end users in order to transport the one or more end users over the transport route leg.

9. The computationally-implemented system of claim 8, wherein circuitry configured for determining a rendezvous location for the at least one transportation vehicle unit to rendezvous with the one or more end users in order to transport the one or more end users over the transport route leg comprises:
    circuitry configured for estimating arrival time of the one or more end users at the rendezvous location, where the rendezvous location is a start of the transport route leg, which follows a preceding route leg along an overall travel route for traveling from the starting location to the destination location of the travel plan.

10. The computationally-implemented system of claim 9, wherein circuitry configured for estimating arrival time of the one or more end users at the rendezvous location, where the rendezvous location is start of the transport route leg, which follows a preceding route leg along an overall travel route for traveling from the starting location to the destination location of the travel plan comprises:
    circuitry configured for estimating the arrival time of the one or more end users at the rendezvous location, where the preceding route leg along the overall travel route does not call for any transportation vehicle unit to transport the one or more end users over any portion of the preceding route leg.

11. The computationally-implemented system of claim 9, wherein circuitry configured for estimating arrival time of the one or more end users at the rendezvous location, where the rendezvous location is start of the transport route leg, which follows a preceding route leg along an overall travel route for traveling from the starting location to the destination location of the travel plan comprises:
    circuitry configured for estimating the arrival time of the one or more end users at the rendezvous location, where the preceding route leg along the overall travel route is a preceding transport route leg that calls for a second transportation vehicle unit to transport the one or more end users over the preceding transport route leg.

12. The computationally-implemented system of claim 7, wherein circuitry configured for developing the one or more portions of the travel plan comprises:
    circuitry configured for estimating one or more planned arrival times of the one or more end users at one or more intermediate locations of at least one of the at least two route legs of the travel plan, the one or more intermediate locations being one or more locations located between a starting point and an end point for the at least one of the at least two route legs.

13. The computationally-implemented system of claim 12, wherein circuitry configured for estimating one or more planned arrival times of the one or more end users at one or more intermediate locations of at least one of the at least two route legs of the travel plan, the one or more intermediate locations being one or more locations located between a starting point and an end point for the at least one of the at least two route legs comprises:
    circuitry configured for estimating the one or more planned arrival times of the one or more end users at the one or more intermediate locations of the at least one of the at least two route legs of the travel plan, the at least one of the at least two route legs of the travel plan being a preceding route leg that precedes the transport route leg along an overall travel route for traveling from the starting location to the destination location of the travel plan.

14. The computationally-implemented system of claim 13, wherein circuitry configured for estimating the one or more planned arrival times of the one or more end users at the one or more intermediate locations of at least one of the route legs of the travel plan, the at least one of the route legs of the travel plan being a preceding route leg that precedes the transport route leg along an overall travel route for traveling from the starting location to the destination location of the travel plan comprises:
    circuitry configured for estimating the one or more planned arrival times of the one or more end users at the one or more intermediate locations of at least one of the route legs of the travel plan, the at least one of the route legs of the travel plan being a preceding route leg that precedes the transport route leg along an overall travel route for traveling from the starting location to the destination location of the travel plan and that does not call for any transportation vehicle unit to transport the one or more end users over any portion of the preceding route leg.

15. The computationally-implemented system of claim 13, wherein circuitry configured for estimating the one or more planned arrival times of the one or more end users at the one or more intermediate locations of at least one of the route legs of the travel plan, the at least one of the route legs of the travel plan being a preceding route leg that precedes the transport route leg along an overall travel route for traveling from the starting location to the destination location of the travel plan comprises:
    circuitry configured for estimating the one or more planned arrival times of the one or more end users at the one or more intermediate locations of at least one of the route legs of the travel plan, the at least one of the route legs of the travel plan being a preceding route leg that precedes the transport route leg along an overall travel route for traveling from the starting location to the destination location of the travel plan and that calls for a second transportation vehicle unit to transport the one or more end users over the preceding route leg.

16. The computationally-implemented system of claim 2, wherein circuitry configured for presenting one or more portions of a travel plan for facilitating the one or more end users to travel to the destination location from the starting location, the travel plan identifying at least two route legs including at least one transport route leg that calls for at least one transportation vehicle unit to transport the one or more end users over the transport route leg comprises:
    circuitry configured for transmitting a request for the one or more portions of the travel plan; and
    circuitry configured for receiving at least the one or more portions of the travel plan.

17. The computationally-implemented system of claim 16, wherein circuitry configured for transmitting a request for the at least one or more portions of the travel plan comprises:
  circuitry configured for transmitting end user preference data that indicates one or more mass transit or ferry preferences of at least one of the one or more end users.

18. The computationally-implemented system of claim 16, wherein circuitry configured for transmitting a request for the at least one or more portions of the travel plan comprises:
  circuitry configured for transmitting end user preference data that indicates one or more geographic preferences of at least one of the one or more end users.

19. The computationally-implemented system of claim 18, wherein circuitry configured for transmitting end user preference data that indicates one or more geographic preferences of at least one of the one or more end users comprises:
  circuitry configured for transmitting end user preference data that indicates one or more geographic preferences of at least one of the one or more end users that relate to one or more geographic locations that the at least one of the one or more end users prefers to be used for rendezvousing with any transportation vehicle unit.

20. The computationally-implemented system of claim 2, wherein circuitry configured for presenting one or more portions of a travel plan for facilitating the one or more end users to travel to the destination location from the starting location, the travel plan identifying at least two route legs including at least one transport route leg that calls for at least one transportation vehicle unit to transport the one or more end users over the transport route leg comprises:
  circuitry configured for presenting one or more portions of the travel plan identifying a detailed planned travel route for traveling at least partway between the starting location and the destination location of the travel plan.

21. The computationally-implemented system of claim 20, wherein circuitry configured for presenting one or more portions of the travel plan identifying a detailed planned travel route for traveling at least partway between the starting location and the destination location of the travel plan comprises:
  circuitry configured for presenting one or more portions of the travel plan identifying a detailed planned travel route for traveling at least one of the at least two route legs of the travel plan.

22. The computationally-implemented system of claim 21, wherein circuitry configured for presenting one or more portions of the travel plan identifying a detailed planned travel route for traveling at least one of the at least two route legs of the travel plan comprises:
  circuitry configured for presenting one or more portions of the travel plan identifying a detailed planned travel route for traveling over a preceding route leg that precedes the transport route leg along an overall travel route for traveling from the starting location to the destination location of the travel plan.

23. The computationally-implemented system of claim 22, wherein circuitry configured for presenting one or more portions of the travel plan identifying a detailed planned travel route for traveling over a preceding route leg that precedes the transport route leg along an overall travel route for traveling from the starting location to the destination location of the travel plan comprises:
  circuitry configured for presenting one or more portions of the travel plan identifying a detailed planned travel route for traveling a preceding route leg that precedes the transport route leg along the overall travel route for traveling from the starting location to the destination location, the preceding route leg not calling for any transportation vehicle unit to transport the one or more end users over any portion of the preceding travel route.

24. The computationally-implemented system of claim 21, wherein circuitry configured for presenting one or more portions of the travel plan identifying a detailed planned travel route for traveling at least one of the at least two route legs of the travel plan comprises:
  circuitry configured for presenting one or more portions of the travel plan identifying a detailed planned travel route for traveling a subsequent route leg that is subsequent to the transport route leg along an overall travel route for traveling from the starting location to the destination location of the travel plan.

25. The computationally-implemented system of claim 2, wherein circuitry configured for presenting one or more portions of a travel plan for facilitating the one or more end users to travel to the destination location from the starting location, the travel plan identifying at least two route legs including at least one transport route leg that calls for at least one transportation vehicle unit to transport the one or more end users over the transport route leg comprises:
  circuitry configured for presenting one or more portions of the travel plan identifying one or more modes of transporting the one or more end users for each of the at least two route legs.

26. The computationally-implemented system of claim 2, wherein circuitry configured for presenting one or more portions of a travel plan for facilitating the one or more end users to travel to the destination location from the starting location, the travel plan identifying at least two route legs including at least one transport route leg that calls for at least one transportation vehicle unit to transport the one or more end users over the transport route leg comprises:
  circuitry configured for presenting one or more portions of the travel plan indicating a rendezvous location and/or rendezvous time for the one or more end users to rendezvous with the at least one transportation vehicle unit in order for the one or more end users to be transported over the transport route leg.

27. The computationally-implemented system of claim 2, wherein circuitry configured for presenting one or more portions of a travel plan for facilitating the one or more end users to travel to the destination location from the starting location, the travel plan identifying at least two route legs including at least one transport route leg that calls for at least one transportation vehicle unit to transport the one or more end users over the transport route leg comprises:
  circuitry configured for presenting one or more portions of the travel plan identifying the at least one transport route leg and a first route leg that is identified as not calling for any transportation vehicle unit to transport the one or more end users over any portion of the first route leg, the at least one transport route leg being a second route leg that calls for the at least one transportation vehicle unit to transport the one or more end users over the second route leg.

28. The computationally-implemented system of claim 27 wherein circuitry configured for presenting one or more portions of the travel plan identifying the at least one transport route leg and a first route leg that is identified as not calling for any transportation vehicle unit to transport the one or more end users over any portion of the first route leg, the at least one transport route leg being a second route leg that calls for the at least one transportation vehicle unit to transport the one or more end users over the second route leg comprises:

circuitry configured for presenting one or more portions of the travel plan identifying the first route leg that is identified as not calling for any transportation vehicle unit to transport the one or more end users over any portion of the first route leg and the second route leg that calls for at least one transportation vehicle unit to transport the one or more end users over the second route leg, the first route leg identified as calling for the one or more end users to travel over the first route leg by walking, by bicycling, by mass transit, and/or by ferry.

29. The computationally-implemented system of claim 2, wherein circuitry configured for presenting one or more portions of a travel plan for facilitating the one or more end users to travel to the destination location from the starting location, the travel plan identifying at least two route legs including at least one transport route leg that calls for at least one transportation vehicle unit to transport the one or more end users over the transport route leg comprises:

circuitry configured for presenting one or more portions of a travel plan for facilitating the one or more end users to travel to the destination location from the starting location, the travel plan having been developed to minimize total travel costs to be incurred in order for the one or more end users to reach the destination location from the starting location.

30. The computationally-implemented system of claim 2, wherein circuitry configured for determining that at least one of the one or more end users is in proximity of a rendezvous location comprises:

circuitry configured for determining that at least one of the one or more end users is within a predefined distance from the rendezvous location.

31. The computationally-implemented system of claim 2, wherein circuitry configured for determining that at least one of the one or more end users is in proximity of a rendezvous location comprises:

circuitry configured for determining that at least one of the one or more end users is within a predefined amount of time from reaching the rendezvous location.

32. The computationally-implemented system of claim 2, wherein circuitry configured for determining that at least one of the one or more end users is in proximity of a rendezvous location comprises:

circuitry configured for detecting that at least one of the one or more end users has reached a particular point along a preceding route leg that precedes the transport route leg along an overall travel route for traveling from a starting location to the destination location of the travel plan.

33. The system of claim 2, further comprising:

circuitry configured for determining at least two route legs associated with different transportation vehicles which minimizes the total travel time to the destination location, the at least two route legs including (i) at least one first route leg that calls for at least one first transportation vehicle unit to transport the one or more end users over the at least one first route leg to a rendezvous location and (ii) at least one second route leg that calls for at least one other transportation vehicle unit to transport the one or more end users over the at least one second route leg from the rendezvous location.

34. The system of claim 33, further comprising:

circuitry configured for detecting that the one or more users are on the at least one first route leg and within a specified time of the at least one rendezvous location to begin the at least one second route leg; and circuitry configured for determining at least one rendezvous time at which the one or more users are expected to arrive at the at least one rendezvous location.

35. The system of claim 34, further comprising:

circuitry configured for determining at least one second transportation vehicle unit based on proximity of the at least one second transportation vehicle unit to the at least one rendezvous location (i) at least partly in response to detection that the one or more users is on the at least one first route leg and within the specified time of the at least one rendezvous location to begin the at least one second route leg and (ii) at least partly in response to determination of the at least one rendezvous time to which the one or more users are expected to arrive at the at least one rendezvous location.

36. The system of claim 35, further comprising:

circuitry configured for transmitting via at least one wireless network at least one request for the at least one second transportation vehicle unit to rendezvous with the one or more users at the at least one rendezvous location at or by the at least one rendezvous time (i) at least partly in response to detection that the one or more users is on the at least one first route leg and within the specified time of the at least one rendezvous location to begin the at least one second route leg and (ii) at least partly in response to determination of the at least one rendezvous time to which the one or more users are expected to arrive at the at least one rendezvous location.

37. The system of claim 2, wherein circuitry configured for determining that at least one of the one or more end users is in proximity of a rendezvous location comprises:

circuitry configured for determining that at least one of the one or more end users is in proximity of a rendezvous location, the rendezvous location being the starting location.

38. The system of claim 2, wherein circuitry configured for determining that at least one of the one or more end users is in proximity of a rendezvous location comprises:

circuitry configured for determining that at least one of the one or more end users is in proximity of a rendezvous location, the rendezvous location being a pickup point for the at least one transport route leg.

39. The system of claim 2, wherein circuitry configured for determining that at least one of the one or more end users is in proximity of a rendezvous location comprises:

circuitry configured for detecting that at least one of the one or more end users is in proximity of a rendezvous location at least partially based on at least one indication of location of the one or more end users indicated by at least one transmission from at least one mobile device of the one or more end users.

40. The system of claim 2, wherein circuitry configured for determining that at least one of the one or more end users is in proximity of a rendezvous location comprises:

circuitry configured for predicting that at least one of the one or more end users is in proximity of a rendezvous location at least partially based on at least some schedule information obtained from at least one third party system.

41. A computer program product, comprising:
at least one non-transitory computer-readable medium including at least:
- one or more instructions for receiving a request for transporting one or more end users to a destination location from a starting location;
- one or more instructions for presenting one or more portions of a travel plan for facilitating the one or more end users to travel to the destination location from the starting location, the travel plan identifying at least two route legs including at least one transport route leg that calls for at least one transportation vehicle unit to transport the one or more end users over the transport route leg;
- one or more instructions for determining that at least one of the one or more end users is in proximity of a rendezvous location; and
- one or more instructions for transmitting a request for one or more transportation vehicle units to rendezvous with the one or more end users at the rendezvous location in order to transport the one or more end users over the at least one transport route leg responsive to the detecting that the at least one of the one or more end users is in proximity of the rendezvous location.

* * * * *

UNITED STATES PATENT AND TRADEMARK OFFICE
CERTIFICATE OF CORRECTION

PATENT NO. : 9,581,455 B2
APPLICATION NO. : 14/455534
DATED : February 28, 2017
INVENTOR(S) : Lord et al.

It is certified that error appears in the above-identified patent and that said Letters Patent is hereby corrected as shown below:

In the Specification

In Column 17, Lines 3-4, "response to detecting that at least one of the one or more end users is" should be --response to detecting that at least one of the one or more end users is in proximity of the rendezvous location.--

In the Claims

In Column 50, Line 5, Claim 1 "route leg responsive to the detecting that the at least one" should be --route leg responsive to the determining that the at least one--

In Column 50, Line 30, Claim 2 "least one transport route leg responsive to the detecting" should be --least one transport route leg responsive to the determining--

In Column 57, Line 23, Claim 41 "responsive to the detecting that the at least one of the" should be --responsive to the determining that the at least one of the--

Signed and Sealed this
Thirtieth Day of May, 2017

Michelle K. Lee
*Director of the United States Patent and Trademark Office*